United States Patent
Kim et al.

(10) Patent No.: US 11,848,461 B2
(45) Date of Patent: Dec. 19, 2023

(54) ENERGY STORAGE MODULE

(71) Applicant: Samsung SDI Co., Ltd., Yongin-si (KR)

(72) Inventors: Jin Taek Kim, Yongin-si (KR); Eun Ok Kwak, Yongin-si (KR); Jang Hoon Kim, Yongin-si (KR); Jin Bhum Yun, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/901,527

(22) Filed: Jun. 15, 2020

(65) Prior Publication Data

US 2021/0074972 A1 Mar. 11, 2021

(30) Foreign Application Priority Data

Sep. 5, 2019 (KR) .................. 10-2019-0110363

(51) Int. Cl.
*H01M 50/383* (2021.01)
*H01M 50/30* (2021.01)
(Continued)

(52) U.S. Cl.
CPC ......... *H01M 50/383* (2021.01); *H01M 4/131* (2013.01); *H01M 4/136* (2013.01);
(Continued)

(58) Field of Classification Search
CPC .. H01M 50/383; H01M 50/394; H01M 50/20; H01M 4/131; H01M 4/136;
(Continued)

(56) References Cited

U.S. PATENT DOCUMENTS 5,047,272 A 9/1991 Hassel et al.
5,817,434 A 10/1998 Brooker et al.
(Continued)

FOREIGN PATENT DOCUMENTS

CN 102468463 A 5/2012
CN 106654462 A 5/2017
(Continued)

OTHER PUBLICATIONS

PubChem Compound Summary for Vermiculite. Webpage. Retrieved on Apr. 5, 2022. Retrieved from the Internet: https://pubchem.ncbi.nlm.nih.gov/compound/156593754 (Year:2022) (Year: 2022).*
(Continued)

*Primary Examiner* — Brian R Ohara
*Assistant Examiner* — Emily Elizabeth Freeman
(74) *Attorney, Agent, or Firm* — Lewis Roca Rothgerber Christie LLP

(57) ABSTRACT

An energy storage module includes: a plurality of battery cells such that long side surfaces of adjacent ones of the battery cells face one another; a plurality of insulation spacers, at least one of the insulation spacers being between adjacent battery cells, each of the insulation spacers including a heat-insulating first sheet and a plurality of flame-retardant second sheets respectively adhered to opposite surfaces of the first sheet by an adhesion member; a cover member including an internal receiving space configured to accommodate the battery cells and the insulation spacers; a top plate coupled to the cover member and including ducts respectively corresponding to vents of the battery cells and having fire extinguishing agent openings respectively corresponding to the insulation spacers; a top cover coupled to the top plate and having discharge openings respectively corresponding to the ducts; and an extinguisher sheet between the top cover and the top plate.

17 Claims, 23 Drawing Sheets

(51) Int. Cl.
  *H01M 50/20* (2021.01)
  *H01M 4/131* (2010.01)
  *H01M 4/136* (2010.01)
  *H01M 4/505* (2010.01)
  *H01M 4/525* (2010.01)
  *H01M 4/58* (2010.01)
  *H01M 4/62* (2006.01)
  *H01M 10/0525* (2010.01)

(52) U.S. Cl.
  CPC ........... *H01M 4/505* (2013.01); *H01M 4/525* (2013.01); *H01M 4/5825* (2013.01); *H01M 4/62* (2013.01); *H01M 10/0525* (2013.01); *H01M 50/20* (2021.01); *H01M 50/394* (2021.01)

(58) Field of Classification Search
  CPC .... H01M 4/505; H01M 4/525; H01M 4/5825; H01M 4/62; H01M 10/0525; H01M 50/30; H02M 4/484
  See application file for complete search history.

(56) References Cited

U.S. PATENT DOCUMENTS

| | | | |
|---|---|---|---|
| 6,136,423 A | 10/2000 | Fitzpatrick | |
| 6,365,299 B1 | 4/2002 | Miyaki et al. | |
| 7,385,480 B2 | 6/2008 | Fitzpatrick | |
| 8,597,808 B2 | 12/2013 | Park et al. | |
| 8,652,666 B2 | 2/2014 | Kim | |
| 9,406,917 B2 | 8/2016 | Petzinger | |
| 9,627,663 B2 | 4/2017 | Kim | |
| 10,164,229 B2 | 12/2018 | Ohshiba et al. | |
| 10,355,326 B2 | 7/2019 | Petzinger | |
| 10,930,910 B2 | 2/2021 | Fujiwara et al. | |
| 11,145,933 B2 | 10/2021 | Kim et al. | |
| 11,185,726 B2 | 11/2021 | Lee | |
| 2002/0179552 A1 | 12/2002 | Marraffa | |
| 2003/0134203 A1 | 7/2003 | Fan et al. | |
| 2007/0164711 A1 | 7/2007 | Kim et al. | |
| 2010/0167115 A1 | 7/2010 | Okada et al. | |
| 2010/0248026 A1 | 9/2010 | Hinoki et al. | |
| 2011/0005781 A1 | 1/2011 | Yasui et al. | |
| 2011/0165454 A1 | 7/2011 | Iwamoto et al. | |
| 2011/0274951 A1 | 11/2011 | Yasui et al. | |
| 2011/0313084 A1 | 12/2011 | Furar et al. | |
| 2012/0114993 A1 | 5/2012 | Park et al. | |
| 2012/0270083 A1 | 10/2012 | Kim | |
| 2013/0011701 A1 | 1/2013 | Petzinger | |
| 2013/0052452 A1 | 2/2013 | Lee et al. | |
| 2013/0264077 A1 | 10/2013 | Jung | |
| 2013/0313466 A1 | 11/2013 | Bliznets et al. | |
| 2014/0170447 A1 | 6/2014 | Woehrle et al. | |
| 2014/0322566 A1 | 10/2014 | Kim | |
| 2015/0064514 A1 | 3/2015 | Wu et al. | |
| 2015/0099191 A1 | 4/2015 | Liu et al. | |
| 2015/0221914 A1 | 8/2015 | Page et al. | |
| 2015/0280193 A1* | 10/2015 | Ohshiba .............. H01M 10/658 361/535 |
| 2015/0303421 A1 | 10/2015 | Tazawa et al. | |
| 2016/0049626 A1 | 2/2016 | Yasui et al. | |
| 2016/0104880 A1 | 4/2016 | Gao et al. | |
| 2016/0218333 A1 | 7/2016 | Takasaki et al. | |
| 2016/0254515 A1 | 9/2016 | Shimoda et al. | |
| 2016/0268564 A1 | 9/2016 | Cho et al. | |
| 2016/0315361 A1 | 10/2016 | Petzinger | |
| 2017/0165513 A1 | 6/2017 | Li | |
| 2017/0334310 A1* | 11/2017 | Yokoyama .............. B60L 58/26 |
| 2018/0026245 A1 | 1/2018 | Page et al. | |
| 2018/0190956 A1* | 7/2018 | Lica .................... H01M 10/625 |
| 2018/0248160 A1 | 8/2018 | Lee | |
| 2018/0269440 A1 | 9/2018 | Lee et al. | |
| 2018/0294516 A1 | 10/2018 | Huang et al. | |
| 2018/0309107 A1 | 10/2018 | Widener | |
| 2019/0109331 A1 | 4/2019 | Skala | |
| 2019/0168037 A1 | 6/2019 | Lian et al. | |
| 2019/0168615 A1 | 6/2019 | Besson et al. | |
| 2019/0173074 A1 | 6/2019 | Ogawa et al. | |
| 2019/0181419 A1 | 6/2019 | Suba et al. | |
| 2019/0305391 A1 | 10/2019 | Petzinger | |
| 2019/0334143 A1 | 10/2019 | Sugeno | |
| 2020/0014027 A1 | 1/2020 | Ha et al. | |
| 2020/0014078 A1 | 1/2020 | Ha et al. | |
| 2020/0168884 A1 | 5/2020 | Wang et al. | |
| 2020/0243823 A1 | 7/2020 | Morita | |
| 2020/0287180 A1 | 9/2020 | Chen et al. | |
| 2020/0303701 A1 | 9/2020 | Kim et al. | |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350580 A1 | 11/2020 | Ha et al. | |
| 2020/0350632 A1* | 11/2020 | Ha ..................... H01M 4/1315 |
| 2020/0377690 A1 | 12/2020 | Ootsuki et al. | |
| 2021/0013460 A1* | 1/2021 | Ootsuki ................ H01M 50/24 |
| 2021/0296625 A1 | 9/2021 | Li et al. | |
| 2021/0320337 A1 | 10/2021 | Chen et al. | |
| 2021/0328281 A1 | 10/2021 | Chu et al. | |
| 2021/0328304 A1 | 10/2021 | You et al. | |
| 2022/0059902 A1 | 2/2022 | Jiang et al. | |
| 2022/0069411 A1 | 3/2022 | Wakabayashi et al. | |
| 2022/0140434 A1 | 5/2022 | Yoshida et al. | |
| 2022/0149477 A1 | 5/2022 | Yoshida et al. | |
| 2022/0149478 A1 | 5/2022 | Egashira et al. | |

FOREIGN PATENT DOCUMENTS

| | | | |
|---|---|---|---|
| CN | 106785225 A | | 5/2017 |
| CN | 206564279 U | | 10/2017 |
| CN | 206584999 U | | 10/2017 |
| CN | 206834290 U | | 1/2018 |
| CN | 107887550 A | | 4/2018 |
| CN | 207199806 U | * | 4/2018 |
| CN | 207199806 U | | 4/2018 |
| CN | 207977389 U | | 10/2018 |
| CN | 109585726 A | | 4/2019 |
| EP | 3386003 A1 | | 10/2018 |
| EP | 3591737 A1 | | 1/2020 |
| EP | 3 866 233 A1 | | 8/2021 |
| JP | 6245038 B2 | | 11/2015 |
| JP | 2016-110881 A | | 6/2016 |
| JP | 2019-213332 A | | 12/2019 |
| KR | 10-1067627 B1 | | 5/2008 |
| KR | 10-2012-0049020 A | | 5/2012 |
| KR | 10-2012-0119407 A | | 10/2012 |
| KR | 10-2014-0127743 A | | 11/2014 |
| KR | 10-2016-0021325 A | | 2/2016 |
| KR | 10-2016-0146349 A | | 12/2016 |
| KR | 10-2019-0023917 A | | 3/2019 |
| WO | WO 2013/006796 A1 | | 1/2013 |
| WO | WO 2019/117485 A1 | | 6/2019 |
| WO | WO-2020203646 A1 | * | 10/2020 ......... H01M 50/191 |

OTHER PUBLICATIONS

EPO Extended European Search Report dated Feb. 16, 2021, issued in corresponding European Patent Application No. 20194611.8 (9 pages).

Collins Online Dictionary entry for "space", accessed at https://www.collinsdictionam.com/us/dictionam/english/space on May 18, 2022, 1 page.

Final Office Action for U.S. Appl. No. 16/901,522 dated May 27, 2022, 24 pages.

Final Office Action for U.S. Appl. No. 17/014,034 dated May 25, 2022, 38 pages.

Final Office Action for U.S. Appl. No. 17/014,853 dated May 31, 2022, 24 pages.

Final Office Action for U.S. Appl. No. 17/014,976 dated Jun. 7, 2022, 24 pages.

(56) References Cited

OTHER PUBLICATIONS

Google define feature utilizing Oxford Languages Dictionary for "space", accessed at google.com on May 18, 2022, 1 page.
Notice of Allowance for U.S. Appl. No. 16/901,541 dated Jun. 1, 2022, 8 pages.
U.S. Advisory Action from U.S. Appl. No. 16/844,914, dated Jan. 20, 2022, 4 pages.
U.S. Notice of Allowance from U.S. Appl. No. 16/901,547, dated Jul. 23, 2021, 8 pages.
U.S. Office Action from U.S. Appl. No. 16/901,474, dated Apr. 25, 2022, 37 pages.
Advisory Action for U.S. Appl. No. 16/901,474 dated Jul. 7, 2022, 4 pages.
Final Office Action for U.S. Appl. No. 17/014,970 dated Jun. 24, 2022, 38 pages.
European Patent Office Extended Search Report, for Patent Application No. 201945730, dated Feb. 12, 2021, 9 pages.
European Patent Office Extended Search Report, for Patent Application No. 201945896, dated Mar. 5, 2021, 9 pages.
European Patent Office Extended Search Report, for Patent Application No. 201946076, dated Feb. 8, 2021, 10 pages.
European Patent Office Extended Search Report, for Patent Application No. 201945946, dated Feb. 10, 2021, 9 pages.
European Patent Office Extended Search Report, for Patent Application No. 201945920, dated Feb. 8, 2021, 9 pages.
European Patent Office Extended Search Report, for Patent Application No. 201945870, dated Feb. 16, 2021, 10 pages.
"The Engineering Tool Box", https://www.engineeringtoolbox.com/density-materials-d1652.html, Aug. 30, 2021 (Year: 2021), 16 pages.
U.S. Notice of Allowance from U.S. Appl. No. 16/901,538, dated Mar. 18, 2022, 8 pages.
U.S. Office Action from U.S. Appl. No. 16/844,914, dated Aug. 19, 2021, 18 pages.
U.S. Office Action from U.S. Appl. No. 16/844,914, dated Mar. 17, 2022, 24 pages.
U.S. Office Action from U.S. Appl.No. 16/844,914, dated Nov. 9, 2021, 18 pages.
U.S. Office Action from U.S. Appl. No. 16/901,474, dated Oct. 20, 2021, 21 pages.
U.S. Office Action from U.S. Appl. No. 16/901,522, dated Dec. 13, 2021, 40 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,034, dated Dec. 13, 2021, 40 pages.
U.S. Office Action from U.S. Appl. No. 17/014,061, dated Feb. 15, 2022, 20 pages.
U.S. Office Action from U.S. Appl.No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,970, dated Mar. 2, 2022, 38 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.
U.S. Restriction Requirement from U.S. Appl. No. 17/014,970, dated Oct. 22, 2021, 6 pages.
Advisory Action for U.S. Appl. No. 17/014,061 dated Oct. 21, 2022, 7 pages.
Chinese Office Action for CN Application No. 202010921939.7 dated Aug. 1, 2022, 9 pages.
Notice of Allowance for U.S. Appl. No. 17/014,976 dated Oct. 19, 2022, 8 pages.
Advisory Action for U.S. Appl. No. 17/014,970 dated Sep. 9, 2022, 3 pages.
Chinese Office Action for CN Application No. 202010920922.X dated Jul. 6, 2022, 13 pages.
Chinese Office Action for CN Application No. 202010921351.1 dated Jul. 5, 2022, 9 pages.
Final Office Action for U.S. Appl. No. 16/844,914 dated Jul. 20, 2022, 8 pages.
Final Office Action for U.S. Appl. No. 17/014,061 dated Jul. 18, 2022, 16 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 17/014,900 dated Aug. 30, 2022, 8 pages.
Notice of Allowance for U.S. Appl. No. 16/901,541 dated Jul. 27, 2022, 8 pages.
Notice of Allowance for U.S. Appl. No. 17/014,976 dated Aug. 16, 2022, 9 pages.
Office Action for U.S. Appl. No. 16/901,474 dated Aug. 17, 2022, 22 pages.
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,538 dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,853 dated Oct. 4, 2022, 25 pages.
Office Action for U.S. Appl. No. 17/014,970 dated Oct. 5, 2022, 38 pages.
US Office Action dated Jun. 30, 2023, issued in U.S. Appl. No. 17/014,853 (31 pages).
U.S. Final Office Action dated Apr. 13, 2023, issued in U.S. Appl. No. 17/014,970 (43 pages).
U.S. Notice of Allowance dated Mar. 7, 2023, issued in U.S. Appl. No. 17/014,089 (11 pages).
U.S. Final Office Action dated Mar. 13, 2023, issued in U.S. Appl. No. 16/901,522 (13 pages).
U.S. Final Office Action dated Mar. 13, 2023, issued in U.S. Appl. No. 17/014,853 (21 pages).
U.S. Office Action dated Mar. 15, 2023, issued in U.S. Appl. No. 17/014,061 (16 pages).
U.S. Office Action dated Aug. 30, 2023, issued in U.S. Appl. No. 17/014,970 (22 pages).

\* cited by examiner

Partially blocking pores through melt-down function

Completely blocking pores->Preventing Li movement

ENERGY STORAGE MODULE

CROSS-REFERENCE TO RELATED APPLICATION

This application claims priority to and the benefit of Korean Patent Application No. 10-2019-0110363, filed on Sep. 5, 2019 in the Korean Intellectual Property Office, the contents of which in its entirety are herein incorporated by reference.

BACKGROUND

1. Field

Aspects of embodiments of the present disclosure relate to an energy storage module.

2. Description of the Related Art

An energy storage module may be linked to a renewable energy and power system, such as, for example, a solar cell, to store electric power when demand for electric power from a load is low and to use (or discharge or provide) the stored electric power when demand for electric power is high. The energy storage module generally includes (or is) an apparatus including a relatively large quantity of battery cells (e.g., secondary batteries or secondary battery cells). The energy storage module, which includes multiple battery cells, generally exhibits high-capacity and high-output characteristics.

The battery cells are generally received (or accommodated) in multiple trays, which are received (or accommodated) in a rack, and multiple racks are received (or accommodated) in a container box.

However, there have recently been instances in which a fire occurs in energy storage modules. And, once a fire starts in an energy storage module, it is not easy to extinguish due to the characteristics of the energy storage module. Thus, research into technology to increase the safety of the energy storage module is being actively conducted.

SUMMARY

Embodiments of the present disclosure are related to an energy storage module exhibiting a reduced fire risk and increased safety by reducing or minimizing the chance of a fire spreading to adjacent battery cells when a fire occurs.

These and other aspects and features of the present disclosure will be described in or will be apparent from the following description of exemplary embodiments of the present disclosure.

According to an aspect of the present disclosure, an energy storage module includes: a plurality of battery cells arranged in a first direction such that long side surfaces of adjacent ones of the battery cells face one another, each of the battery cells including a vent; a plurality of insulation spacers, at least one of the insulation spacers being between the long side surfaces of each adjacent pair of the battery cells, each of the insulation spacers including a heat-insulating first sheet and a plurality of flame-retardant second sheets respectively adhered to opposite surfaces of the first sheet by an adhesion member; a cover member including an internal receiving space configured to accommodate the battery cells and the insulation spacers; a top plate coupled to a top of the cover member, the top plate including ducts respectively corresponding to the vents of the battery cells and having fire extinguishing agent openings respectively corresponding to the insulation spacers; a top cover coupled to a top of the top plate and having discharge openings respectively corresponding to the ducts; and an extinguisher sheet between the top cover and the top plate, the extinguisher sheet being configured to emit a fire extinguishing agent at a temperature exceeding a reference temperature.

The first sheet may include ceramic paper, and the second sheets may include MICA paper.

The first sheet may include a ceramic fiber including an alkaline earth metal.

The long side surfaces of adjacent ones of the battery cells may be spaced apart from each other by a first distance, and a thickness of each of the insulation spacers may be less than 50% of the first distance.

When the fire extinguishing agent is emitted from the extinguisher sheet, the fire extinguishing agent may fill spaces between the insulation spacers and the battery cells through the fire extinguishing agent openings.

Each of the insulation spacers may have a width-direction size less than twice a height-direction size thereof, and the first sheet may be adhered to the second sheets at opposite ends thereof by the adhesion member.

The insulation spacers may further include an edge part including a plastic material, and the edge part may be formed at peripheral edges of the first and second sheets by insert molding.

The edge part may have a width in a range from 3 mm to 6 mm.

One surface of each of the insulation spacers may face the long side surface of one of the battery cells, and the other surface of each of the insulation spacers may face the long side surface of another one of the battery cells.

The first sheet and the second sheets may be spaced apart from each other at central portions thereof to form air passages.

The first sheet may be spaced apart from each of the second sheets by the adhesion member.

A width-direction size of the insulation spacers may be greater than twice a height-direction size thereof, and the first sheet and the second sheets may be adhered to each other by the adhesion member applied to a region adjacent top and bottom ends of each of the first sheet and the second sheets.

One surface of each of the insulation spacers may face the long side surfaces of two of the battery cells, and the other surface of each of the insulation spacers may face the long side surfaces of another two of the battery cells.

Each of the battery cells may include: a negative electrode including a negative electrode current collector, a negative electrode active material layer on the negative electrode current collector, and a negative electrode function layer on the negative electrode active material layer; and a positive electrode including a positive electrode current collector and a positive electrode active material layer on the positive electrode current collector. The negative electrode function layer may include flake-shaped polyethylene particles, and the positive electrode active material layer may include a first positive electrode active material including at least one composite oxide of lithium and a metal selected from the group consisting of cobalt (Co), manganese (Mn), nickel (Ni) and a combination of these metals, and a second positive electrode active material including a compound represented by the Chemical Formula (1):

$$Li_aFe_{1-x}M_xPO_4 \tag{1}$$

wherein 0.90≤a≤1.8, 0≤x≤0.7, and M is Mg, Co, Ni or combinations thereof.

The flake-shaped polyethylene particles may have an average particle diameter (D50) in a range from 1 µm to 8 µm.

The flake-shaped polyethylene particles may have an average particle diameter (D50) in a range from 2 µm to 6 µm.

The flake-shaped polyethylene particles may have a thickness in a range from 0.2 µm to 4 µm.

The first positive electrode active material and the second positive electrode active material may be contained in a weight ratio in a range from 97:3 to 80:20.

As described above, the energy storage module according to embodiments of the present disclosure suppresses ignition by providing a shut-down function to a battery cell by using compositions of negative and positive electrode active materials and can prevent or reduce heat from spreading to adjacent cells by rapidly extinguishing and cooling a battery cell when a vent of a battery cell opens (or ruptures) and/or when a fire occurs.

DETAILED DESCRIPTION

Figure 1:
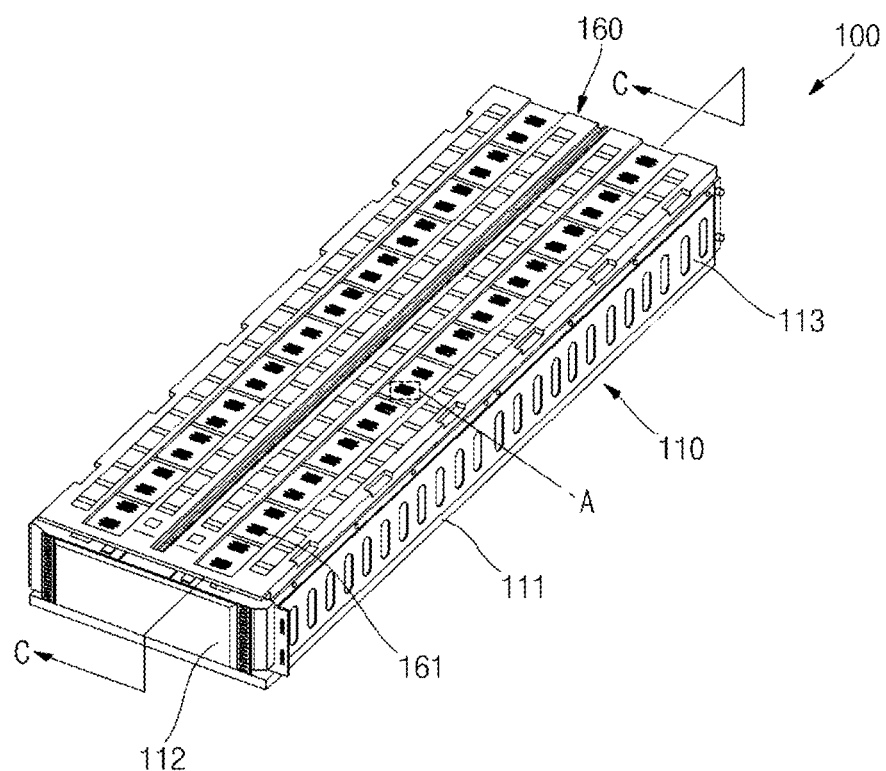
FIG. 1 is a perspective view of an energy storage module according to an embodiment of the present disclosure.

Hereinafter, embodiments of the present disclosure will be described in detail. The subject matter of the present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components or layers may be exaggerated for brevity and clarity. Like numbers refer to like elements throughout. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing example embodiments of the present disclosure and is not intended to be limiting of the present disclosure. As used herein, the singular forms are intended to include the plural forms as well, unless the context clearly indicates otherwise.

Further, the use of "may" when describing embodiments of the present disclosure relates to "one or more embodiments of the present disclosure." Expressions, such as "at least one of," when preceding a list of elements, modify the entire list of elements and do not modify the individual elements of the list.

It will be further understood that the terms "comprise," "comprising," "include," "including," "has," and variations thereof, when used in this specification, specify the presence of the stated features, numbers, steps, operations, elements, and/or components but do not preclude the presence or addition of one or more other features, numbers, steps, operations, elements, components, and/or groups thereof. It will be understood that, although the terms first, second, etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the scope of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "over" or "above" the other elements or features. Thus, the exemplary term "below" can encompass both an orientation of above and below.

Hereinafter, a configuration of an energy storage module according to embodiments of the present disclosure will be described.

Figure 2:
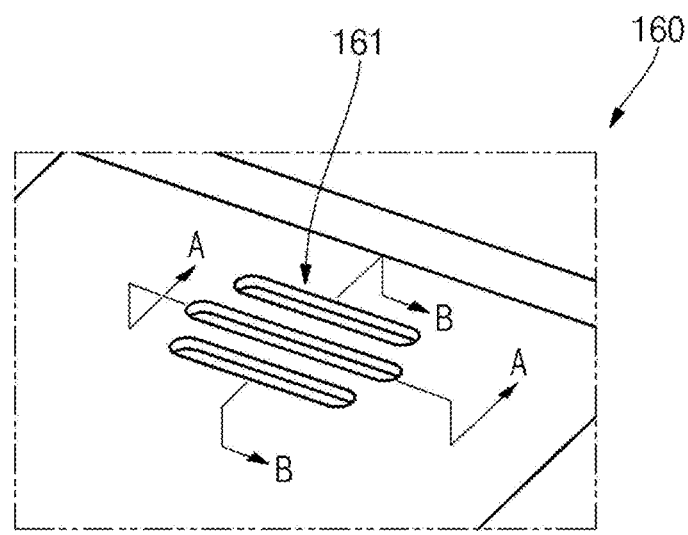
FIG. 2 is a partially enlarged view of the portion A of FIG. 1.
Figure 3:
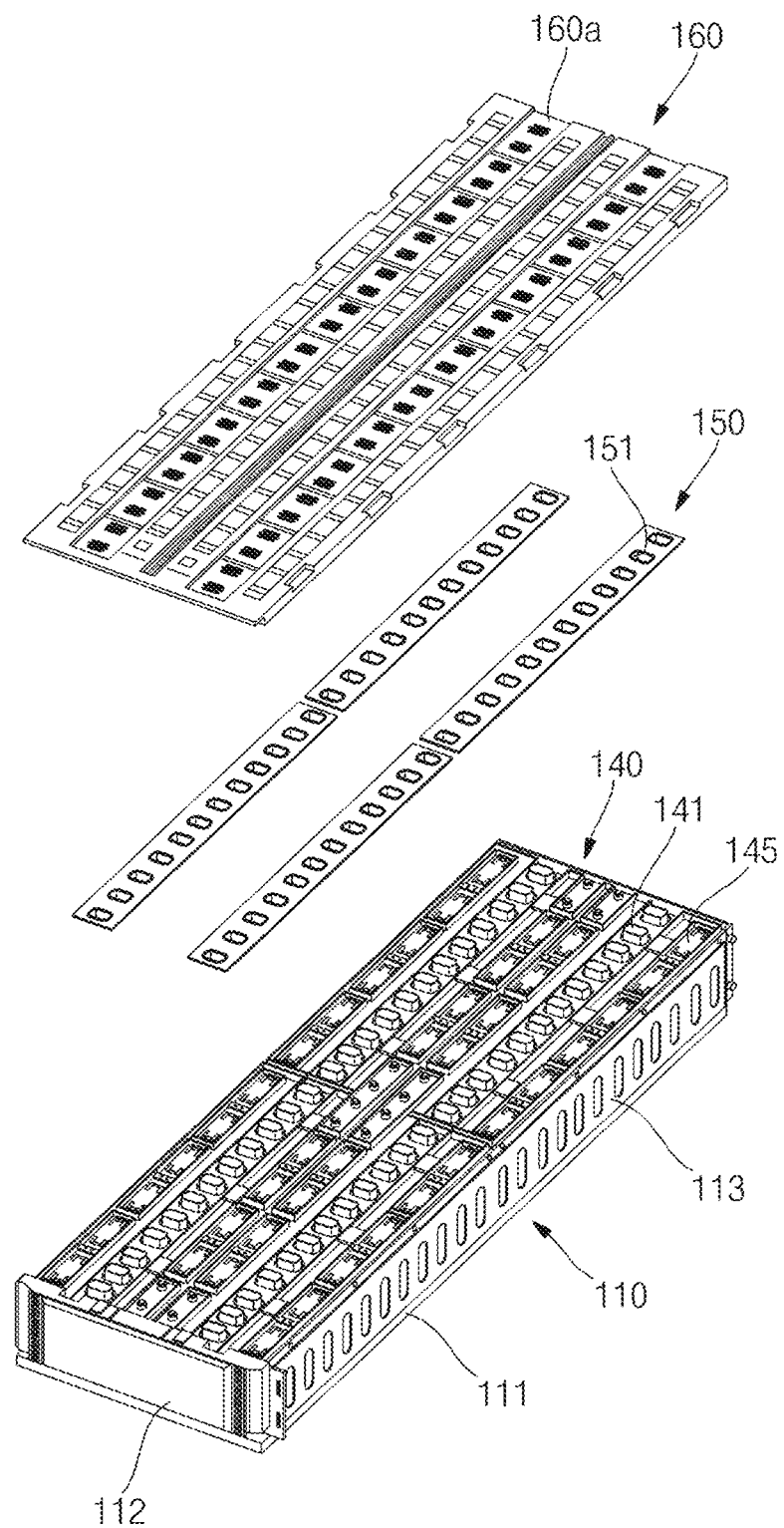
FIG. 3 is an exploded perspective view of the energy storage module shown in FIGS. 1 and 2.
Figure 4:
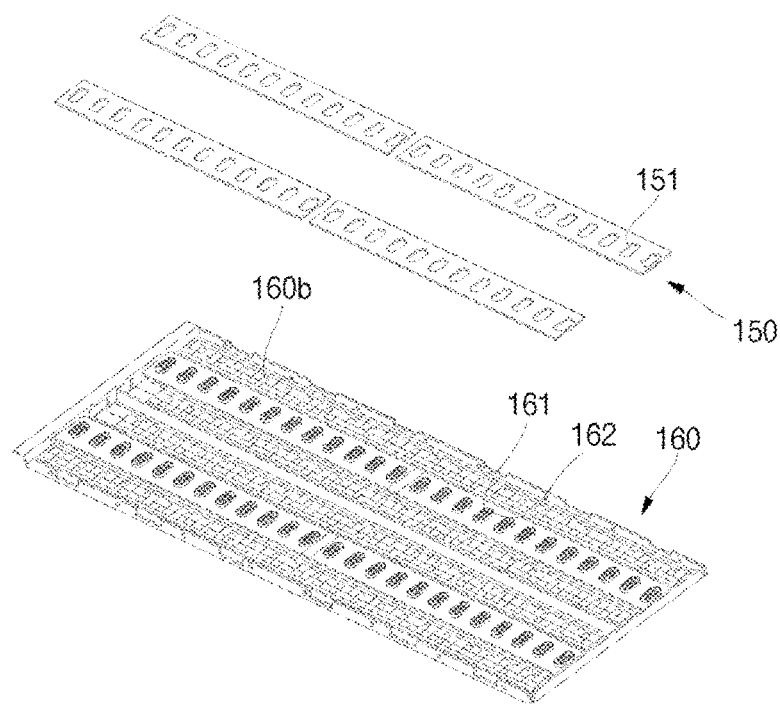
FIG. 4 is an exploded perspective bottom view of an extinguisher sheet and a top cover of the energy storage module shown in FIGS. 1-3.
Figure 5:
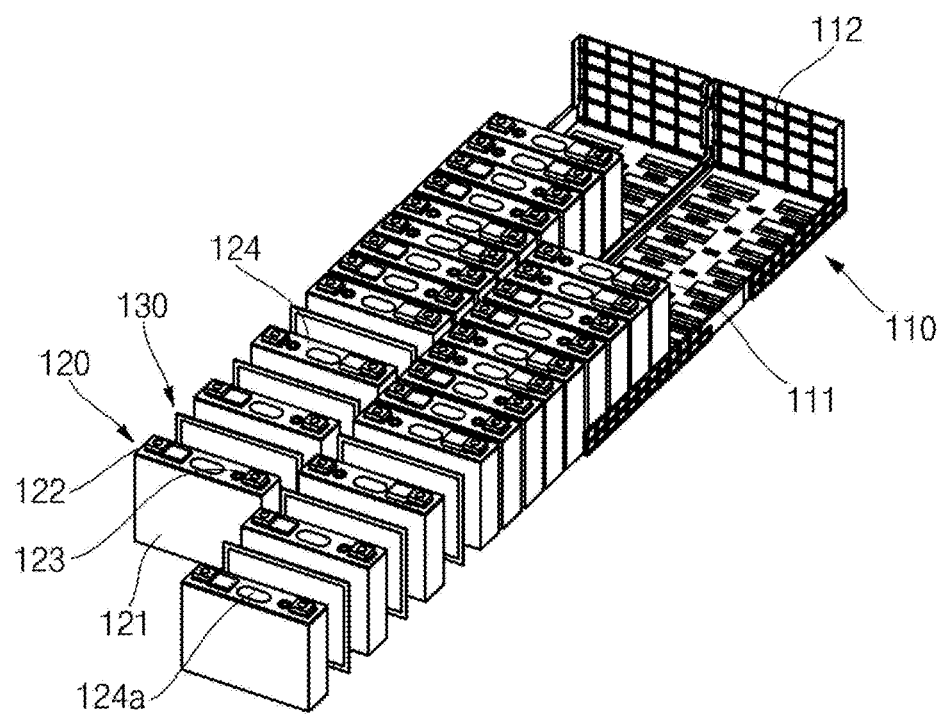
FIG. 5 illustrates battery cells and insulation spacers arranged on a bottom plate of the energy storage module shown in FIGS. 1-3.

FIG. 1 is a perspective view of an energy storage module according to an embodiment of the present disclosure, FIG. 2 is a partially enlarged view of the portion A of FIG. 1, FIG. 3 is an exploded perspective view of the energy storage module shown in FIGS. 1 and 2, FIG. 4 is an exploded perspective bottom view of a bottom surface of an extinguisher sheet and of a top cover of the energy storage module shown in FIGS. 1-3, and FIG. 5 illustrates battery cells and insulation spacers arranged on a bottom plate of the energy storage module shown in FIGS. 1-4.

Referring to FIGS. 1-5, the energy storage module 100 according to an embodiment of the present disclosure may include a cover member 110, battery cells 120, insulation spacers 130, a top plate 140, an extinguisher sheet 150, and a top cover 160.

The cover member 110 may provide an internal space for receiving (or accommodating) battery cells 120 and insulation spacers 130. The cover member 110 includes a bottom plate 111, an end plate (or a plurality of end plates) 112, and a side plate (or a plurality of side plates) 113 which together form a space for accommodating the battery cells 120 and the insulation spacers 130. In addition, the cover member 110 may fix positions of the battery cells 120 and the insulation spacers 130 and may protect the battery cells 120 from external impacts.

The battery cells 120 may be alternately arranged on a top surface of the bottom plate 111 of the cover member 110 with the insulation spacers 130 (e.g., with the insulation spacers 130 arranged between adjacent ones of the battery cells 120). For example, the battery cells 120 may be arranged in a plurality of columns (e.g., two columns) along the top surface of the bottom plate 111 such that long side surfaces of the battery cells 120 face each other, and the insulation spacers 130 may be positioned between adjacent ones of the long side surfaces of the battery cells 120.

Each of the battery cells 120 includes an electrode assembly accommodated in a case 121. The electrode assembly may be configured by winding, stacking, or laminating a positive electrode plate and a negative electrode plate, each having a portion coated with an active material (e.g., a coating or coated portion), in a state in which a separator is positioned between the positive and negative electrode plates. A top portion of the case 121 may be sealed by a cap plate 124. In addition, a vent 124a is located at roughly the center of the cap plate 124 and has a smaller thickness than other regions of the cap plate 124. In addition, electrode terminals 122 and 123, which are electrically connected to uncoated regions (e.g., uncoated portions) of the positive and negative electrode plates, may be exposed at an upper portion of the case 121 through the cap plate 124. The electrode terminals 122 and 123 may be referred to as a first electrode terminal 122 and a second electrode terminal 123, respectively, defining, for example, a negative electrode terminal and a positive electrode terminal, but the polarities thereof may be reversed. Occurrences of ignition of the battery cells 120 can be reduced by using particular compositions of active materials of the battery cells 120, thereby increasing safety. Such active material compositions will be described in more detail below.

The insulation spacers 130 may be positioned between each of (e.g., between adjacent ones of) the battery cells 120 to prevent the battery cells 120 from contacting one another, thereby maintaining the battery cells 120 (e.g., the cases 121 of the battery cells 120) in an electrically isolated state. In addition, a reference distance or space (e.g., a predetermined distance) is maintained between each of the insulation spacers 130 and the battery cells 120 to establish external air passages (e.g., fire extinguishing agent passages), thereby allowing for the cooling of the battery cells 120. The insulation spacers 130 may include a flame-retardant (or non-combustible) sheet that prevents (or substantially impedes) a fire from spreading to neighboring battery cells 120 and a heat-insulating sheet that prevents (or substantially impedes) heat from propagating to neighboring battery cells 120 when a fire starts in any of the battery cells 120. Configurations of the insulation spacers 130 will be described in more detail below.

The top plate 140 may be coupled to a top portion (e.g., a top surface or a top) of the cover member 110. The top plate 140 may be coupled to the cover member 110 while covering top portions (e.g., top surfaces) of the battery cells 120. In addition, the positive electrode terminals 123 and negative electrode terminals 122 of the battery cells 120 are exposed to (or through) the top plate 140, and bus bars 145 are coupled to the respective terminals 122/123, thereby connecting the battery cells 120 to one another in series, in parallel, or in series/parallel.

The top plate 140 includes a plurality of ducts 141 located to respectively correspond to the vents 124a, which are located on the top surface of each of the battery cells 120. The ducts 141 may be arranged in one direction, for example, in a length direction of the top plate 140. Accordingly, the gas discharged from the vent 124a of one of the battery cells 120 may move upwardly along a corresponding one of the ducts 141 of the top plate 140. The configuration and operation of the ducts 141 will be described in more detail below.

The extinguisher sheet 150 is positioned between the top plate 140 and the top cover 160. The extinguisher sheet 150 may be provided as one or more members (or sheets) extending in one direction, for example, in the length direction, of the top plate 140. In addition, the extinguisher sheet 150 may include openings (e.g., opening holes) positioned to respectively correspond to the ducts 141 of the top plate 140. Accordingly, the extinguisher sheet 150 may be positioned such that the openings therein are respectively aligned with the ducts 141 of the top plate 140. In addition, the extinguisher sheet 150 may be coupled to a bottom surface 160b of the top cover 160. Because the extinguisher sheet 150 is coupled to the bottom surface 160b of the top cover 160, the extinguisher sheet 150 may be positioned above the top plate 140. The configuration and operation of the extinguisher sheet 150 will be described below in more detail.

The top cover 160 is coupled to the top portion of the top plate 140. The top cover 160 may cover the top plate 140 and the bus bars 145. The top cover 160 also covers the extinguisher sheet 150, which is coupled to the bottom surface 160b of the top cover 160, thereby protecting the top plate 140, the bus bars 145, and the extinguisher sheet 150 from external impacts applied to a top surface 160a of the top cover 160. In addition, the top cover 160 may include discharge openings (e.g., discharge holes) 161. In addition, the top cover 160 may further include protrusion parts (e.g., a protrusions) 162 spaced a distance apart from the outer periphery of (e.g., may extend around a periphery of) respective ones of the discharge openings 161, and the protrusion parts 162 downwardly protrude from the top cover 160. Openings (e.g., opening holes) 151 of the extinguisher sheet 150 may be coupled to (e.g., may extend around) the exterior of respective ones of the protrusion parts 162, and the ducts 141 may be coupled to (e.g., may extend into) the interior of the protrusion parts 162. The discharge openings 161 may each include a plurality of discharge opening (e.g., discharge sub-openings) arranged in one direction, for example, in a length direction, of the top cover 160. In addition, the discharge openings 161 may be positioned to respectively correspond to the ducts 141 of the top plate 140. In addition, the discharge openings 161 may each be provided as a plurality of openings passing through the top and bottom surfaces of the top plate 140 and spaced apart from one another. Accordingly, the gases discharged from the vent 124a of the battery cell 120 when the vent 124a ruptures may be discharged to the exterior through the corresponding duct 141 of the top plate 140 and the corresponding discharge opening 161 of the top cover 160 and may facilitate user safety by preventing a user's hand from contacting the internal structure of the top cover 160.

Hereinafter, the ducts 141 of the top plate 140 in the energy storage module 100 according to an embodiment of the present disclosure will be described in more detail.

Figure 6A:
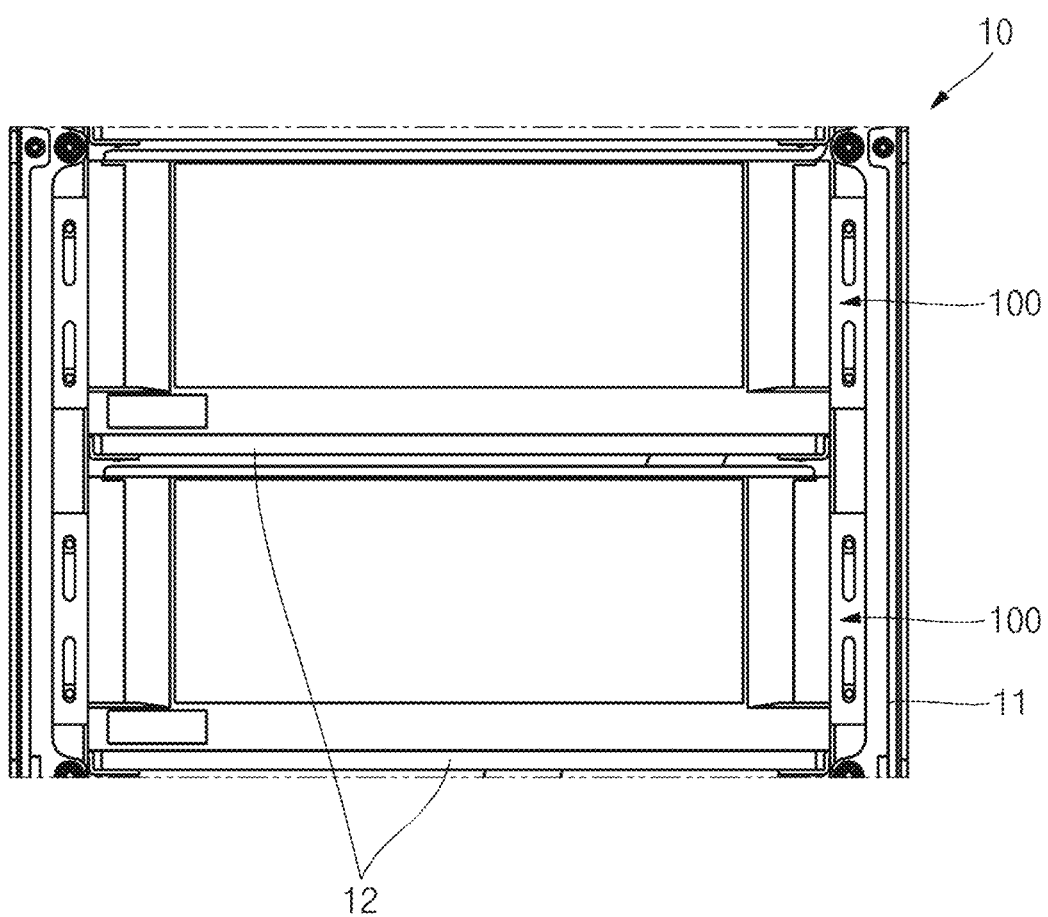
FIG. 6A illustrates a rack on which energy storage modules are coupled according to an embodiment of the present invention.
Figure 6B:
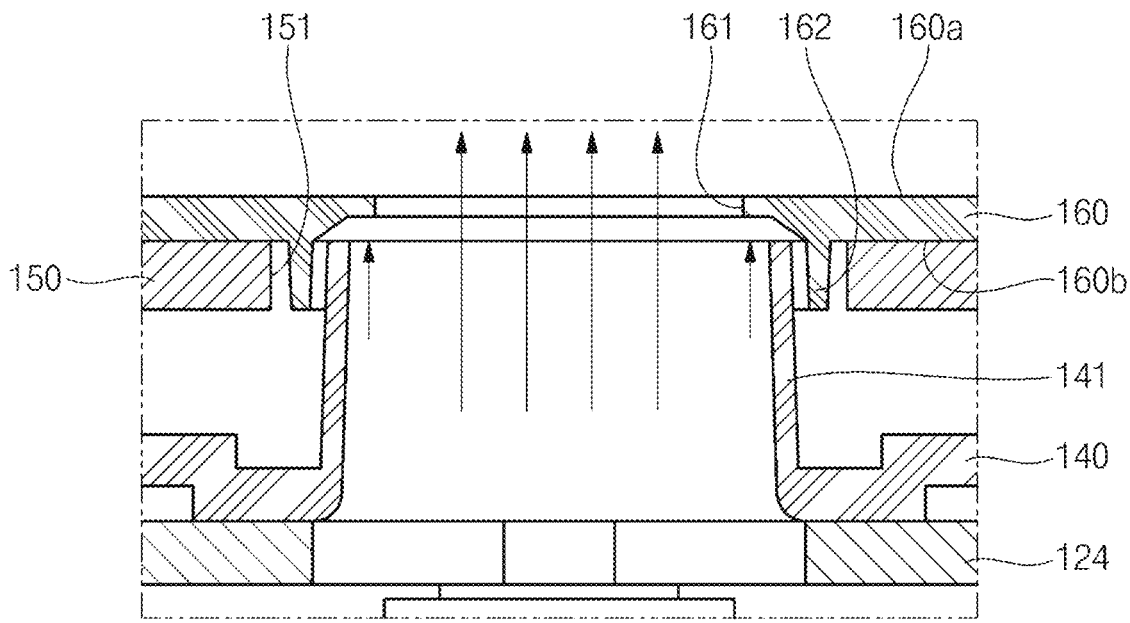
FIGS. 6B and 6C illustrate internal gas movement from a battery cell through a duct in the energy storage module shown in FIGS. 1-4.
Figure 6C:
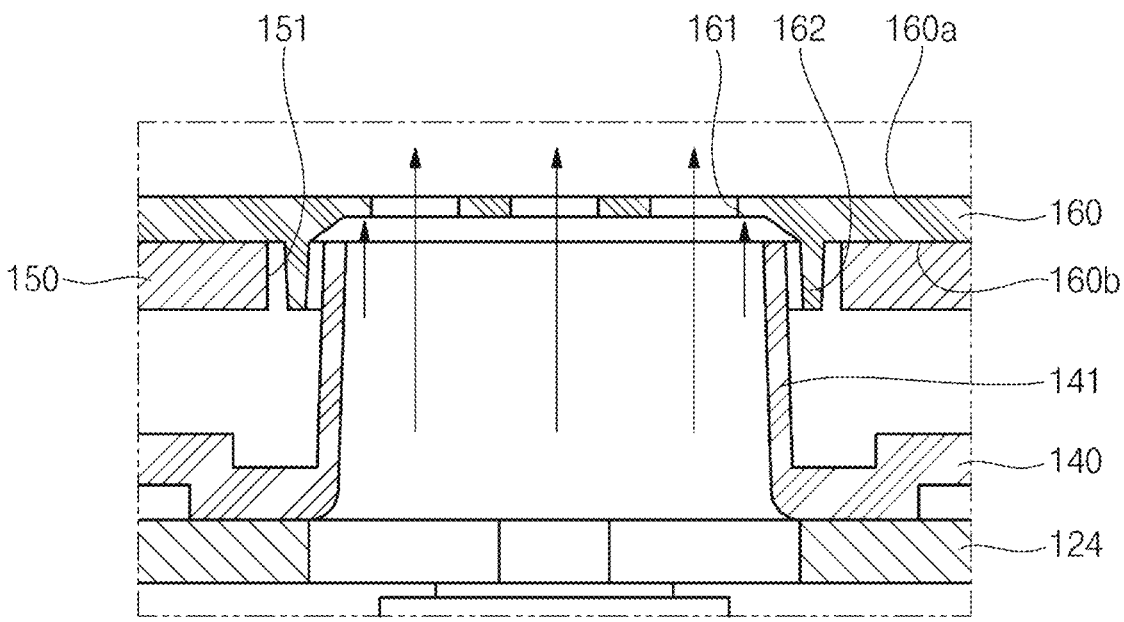

FIG. 6A illustrates a portion of a rack accommodating a plurality of energy storage modules 100 according to an embodiment of the present disclosure, and FIGS. 6B and 6C illustrate movement of gas from a battery cell 120 through a duct 141 in the energy storage module 100 shown in FIGS. 1-5. FIG. 6B illustrates an enlarged cross-sectional view taken along the line A-A of FIG. 2, and FIG. 6C illustrates an enlarged cross-sectional view taken along the line B-B of FIG. 2.

Referring to FIG. 6A, a rack 10 includes a plurality of shelves 12 and a plurality of the energy storage modules 100 accommodated on the shelves 12 of the rack 10. The number of energy storage modules 100 may vary according to the desired capacity, and the energy storage modules 100 may be mounted in the rack 10 and then fixed thereto. The rack 10 may include a frame 11 defining the overall external shape of the rack 10 and shelves 12 at different layers of the frame 11 to support bottom portions (e.g., bottom surfaces) of the energy storage modules 100. Here, a bottom surface of one of the energy storage modules 100 may contact a top surface of a first shelf 12, and a bottom surface of another one of the energy storage modules 100 may be positioned on the top surface of a second shelf 12 while being spaced a distance apart from the top surface of the first shelf 12. In FIG. 6A, two shelves 12 are shown in the frame 11 with energy storage modules 100 respectively mounted on the shelves 12, but the present disclosure is not limited to the numbers in the illustrated embodiment.

In addition, as described above, the ducts 141 located on the top plate 140 respectively correspond to the vents 124a of the battery cells 120. Referring to FIGS. 6B and 6C, the gas discharged from one of the vents 124a may move upwardly along the duct 141, as indicated by the arrows. In addition, if the vent 124a of a battery cell 120 ruptures, the gas may be discharged to the exterior through the discharge opening 161 of the top cover 160 positioned above the duct 141. In some embodiments, a shelf 12 of the rack 10, which supports another energy storage module 100, is positioned over the top surface 160a of the top cover 160 so that the gas accumulates between the top surface 160a of the top cover 160 and the adjacent shelf 12. A distance between the top surface 160a of the top cover 160 and the adjacent shelf 12 may be in a range from about 3 mm to about 7 mm. When the distance is greater than or equal to about 3 mm, the heat generated from the energy storage module 100 can be easily discharged to the exterior. When the distance is less than or equal to about 7 mm, a high-temperature inert gas atmosphere can be easily created, which will be further described below.

When the vent 124a of the battery cell 120 ruptures, electrolyte vapor component gas having a relatively low temperature of about 170° C. is primarily generated at an initial stage and inert gas having a relatively high temperature of about 400° C. are gradually generated at later stages (e.g., at a later time). In addition, when the gas having the relatively low temperature is emitted, heat-resistant plastic materials constituting the top plate 140 and the top cover 160 may be maintained without being melted. But if the separator melts due to a further increase in the internal temperature of the battery cell 120, high-temperature inert gas may be generated with flames. As described above, the inert gas may fill a space between the top surface 160a of the top cover 160 and the adjacent shelf 12 to create an inert gas atmosphere, thereby preventing oxygen induction.

The inert gas can prevent flames generated by the battery cell 120 from spreading to neighboring battery cells 120 or to another energy storage module 100. In addition, the extinguisher sheet 150, which is positioned under the top cover 160, may operate (e.g., may emit or spray the fire extinguishing agent) in response to the high-temperature inert gas, which will be described in more detail below.

Hereinafter, the configuration and operation of the extinguisher sheet 150 of the energy storage module 100 according to an embodiment of the present disclosure will be described in more detail.

Figure 7:
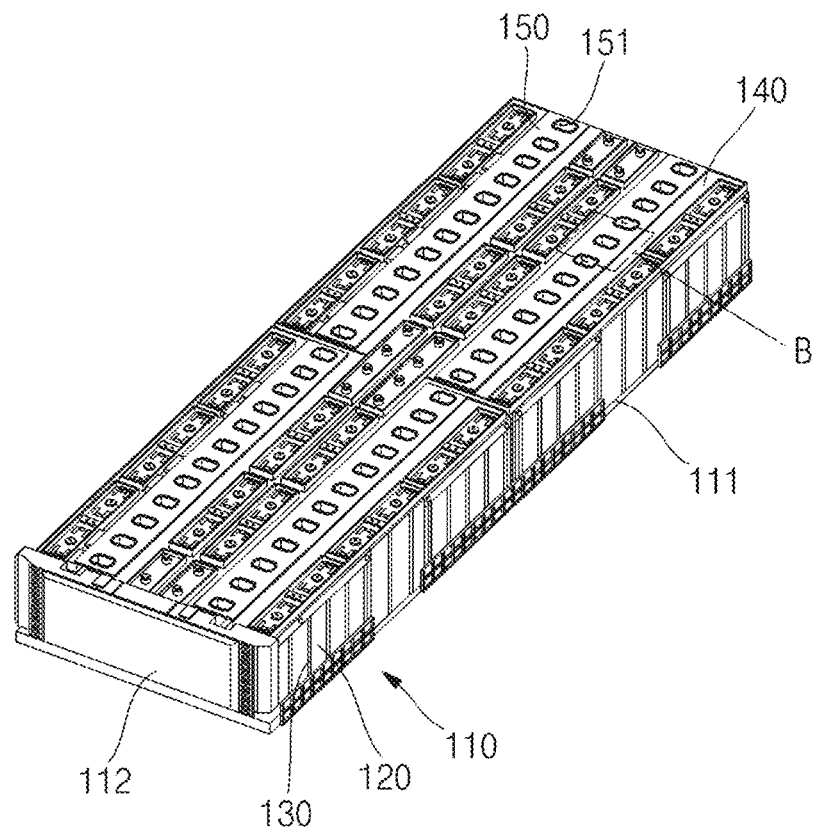
FIG. 7 is a perspective view of the extinguisher sheet coupled to the top plate of the energy storage module shown in FIGS. 1-4.
Figure 8:
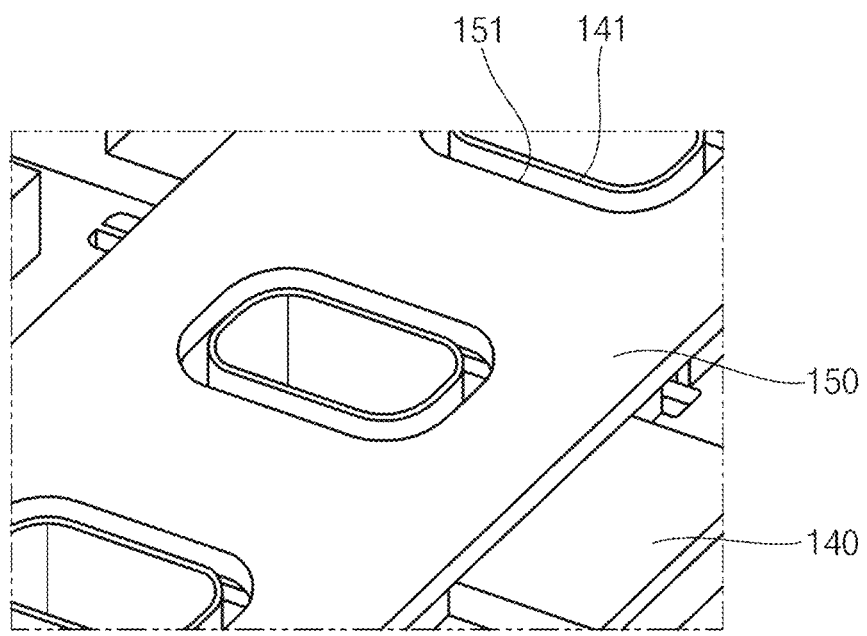
FIG. 8 is a partially enlarged view of the portion B of FIG. 7.
Figure 9A:
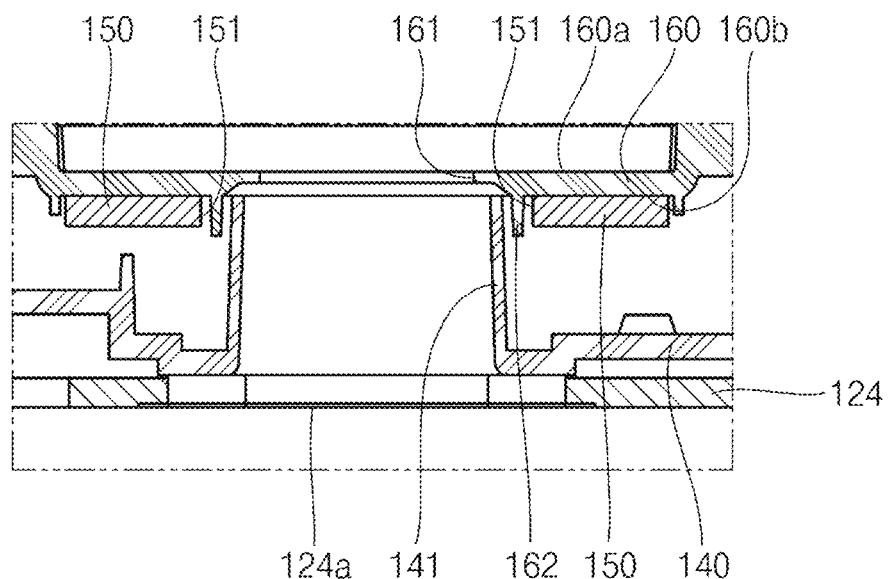
FIGS. 9A and 9B are diagrams illustrating a state in which an extinguisher sheet operates in the energy storage module shown in FIGS. 1-4.
Figure 9B:
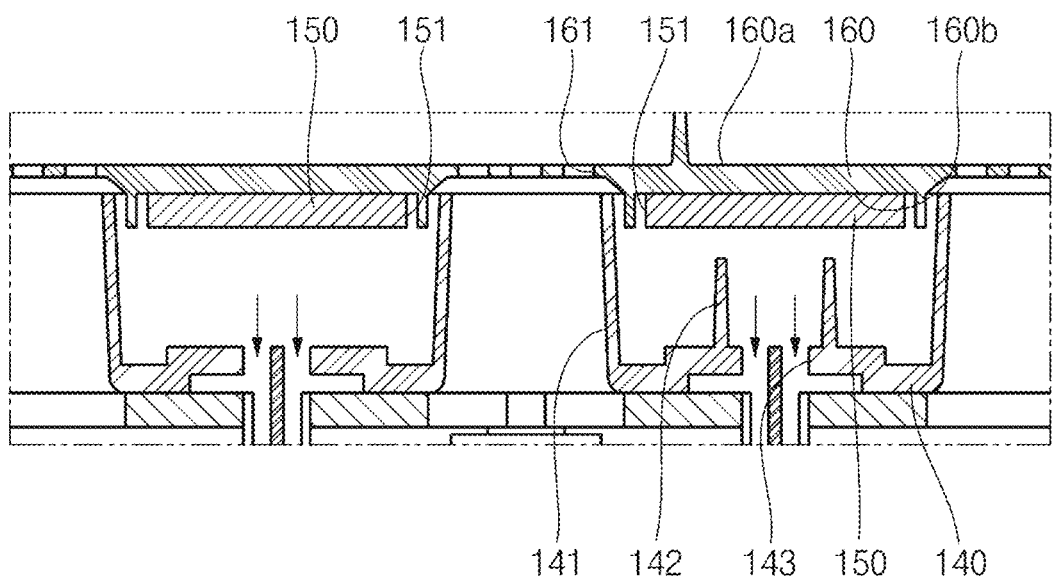

FIG. 7 is a perspective view illustrating the extinguisher sheet 150 coupled to the top plate 240 in the energy storage module 100 according to an embodiment of the present disclosure. FIG. 8 is a partially enlarged view of the portion B of FIG. 7. FIGS. 9A and 9B are diagrams illustrating the operation of the extinguisher sheet 150 in the energy storage module 100 according to an embodiment of the present disclosure.

Referring to FIGS. 7 and 8, the extinguisher sheet 150 may be positioned between the top plate 140 and the top cover 160, as described above. As shown in FIG. 7, the extinguisher sheet 150 may have openings (e.g., opening holes) 151 respectively coupled to (e.g., extending around) the ducts 141 of the top plate 140. Accordingly, movement of gas through the ducts 141 may not be influenced (or substantially influenced) by the extinguisher sheet 150.

In addition, referring to FIGS. 9A and 9B, the extinguisher sheet 150 may operate (e.g., may emit the fire extinguishing agent) in response to heat when the inert gas having a relatively high temperature of, for example, about 400° C., is generated. The fire extinguishing agent contained in the extinguisher sheet 150 is emitted by (e.g., is sprayed from) the extinguisher sheet 150 in response to the high-temperature gas. In addition, because a top portion of the extinguisher sheet 150 is covered by the top cover 160, the fire extinguishing agent may be directionally emitted (or sprayed) toward the bottom surface of the top cover 160. In addition, the fire extinguishing agent may reach the underlying insulation spacers 130 through openings (e.g., fire extinguishing agent openings or opening holes) 143 located between adjacent ones of the ducts 141 of the top plate 140. In addition, a fluid guide protrusion 142 may further be provided around the openings 143 in the duct 141, thereby efficiently guiding the movement of the fire extinguishing agent toward the insulation spacers 130. As will be further described below, after reaching the insulation spacers 130, the fire extinguishing agent may move along surfaces of the insulation spacers 130, thereby extinguishing a fire on a battery cell 120 and cooling the battery cell 120.

In addition, the extinguisher sheet 150 may include a capsule-type fire extinguishing agent received within (e.g., is accommodated or stored in) an external case. As described above, the extinguisher sheet 150 may emit the internal fire extinguishing agent such that the capsule-type fire extinguishing agent and the external case open (or rupture) when the gas passing through the duct 141 of the top plate 140 reaches a relatively high temperature of about 400° C.

Hereinafter, configurations and operations of the battery cells 120 and the insulation spacers 130 in the energy storage module 100 according to an embodiment of the present disclosure will be described.

Figure 10:
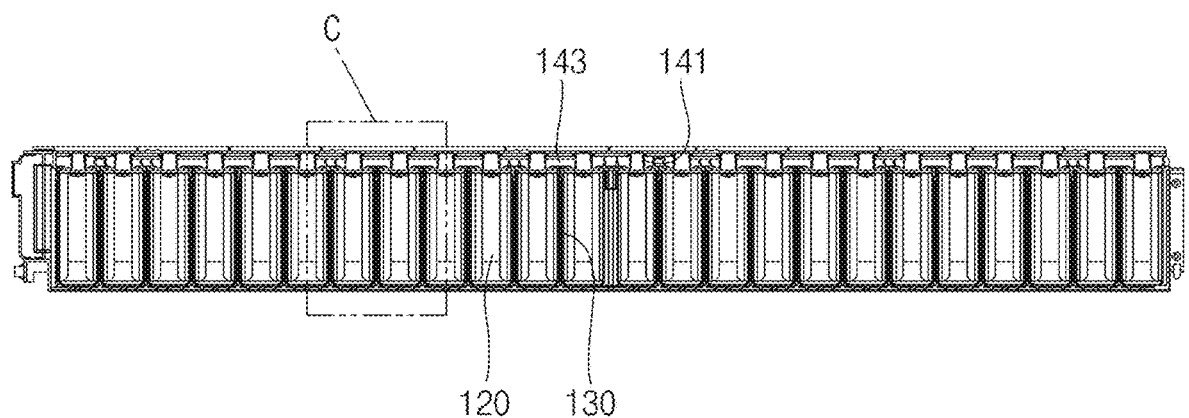
FIG. 10 is a cross-sectional view taken along the line C-C of FIG. 1.
Figure 11:
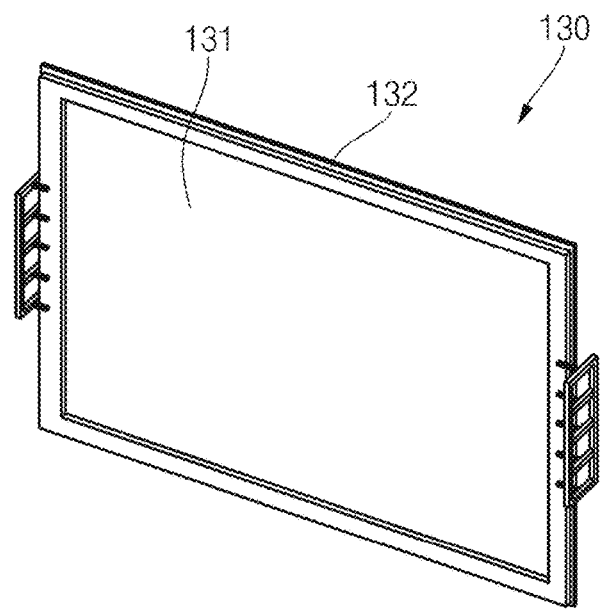
FIG. 11 is a perspective view of an insulation spacer.
Figure 12A:
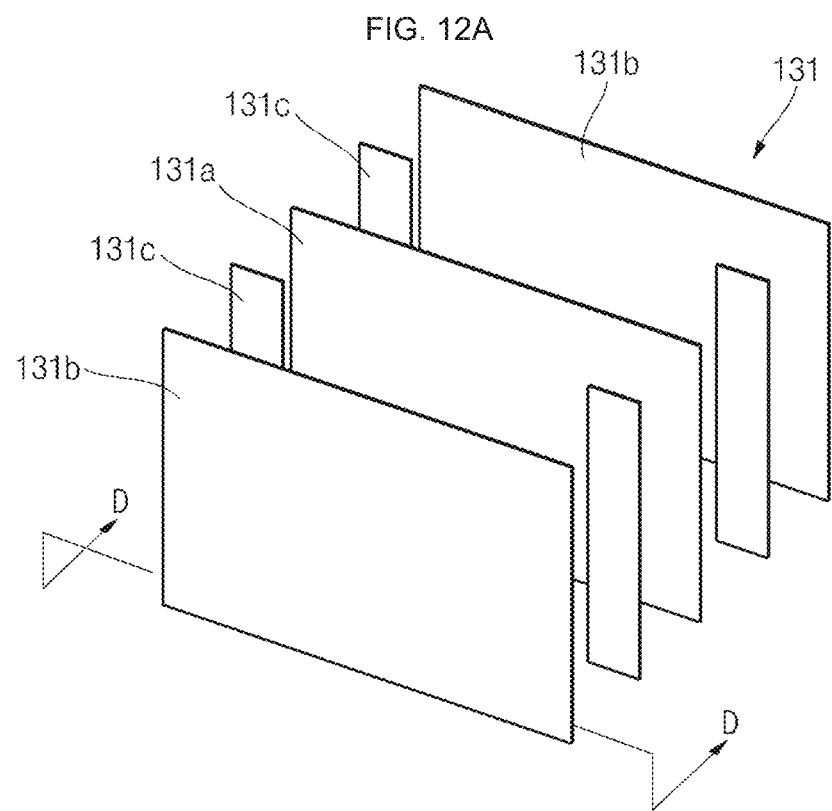
FIGS. 12A and 12B are exploded perspective views illustrating example configurations of sheet parts of the insulation spacer shown in FIG. 11.
Figure 12B:
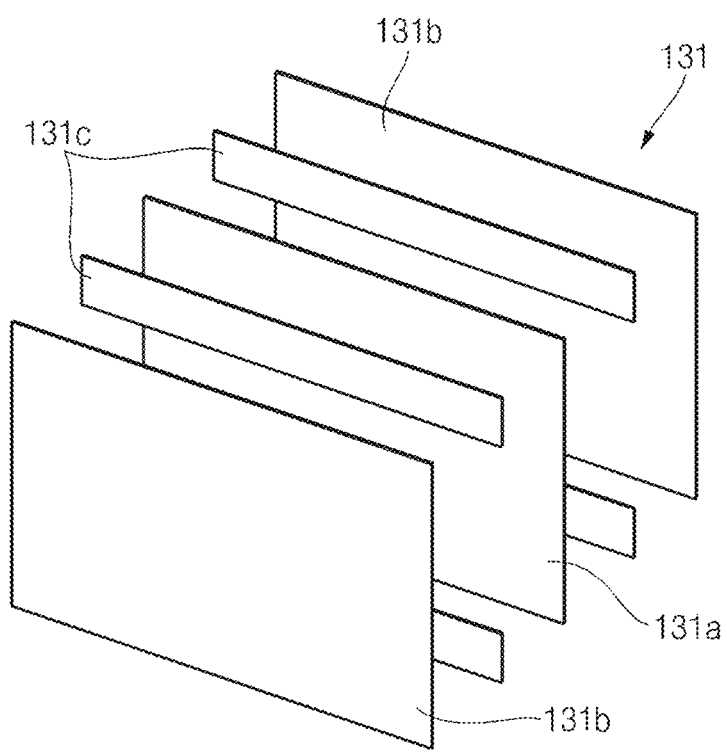
Figure 13:
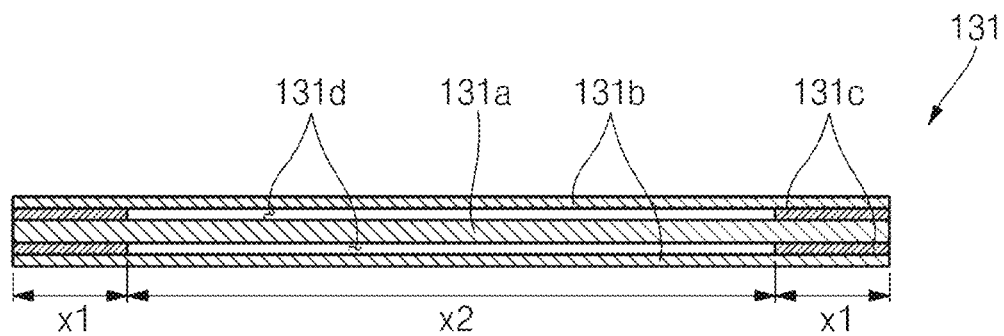
FIG. 13 is a cross-sectional view taken along the line D-D of FIG. 12A after the sheet parts are adhered to each other.
Figure 14:
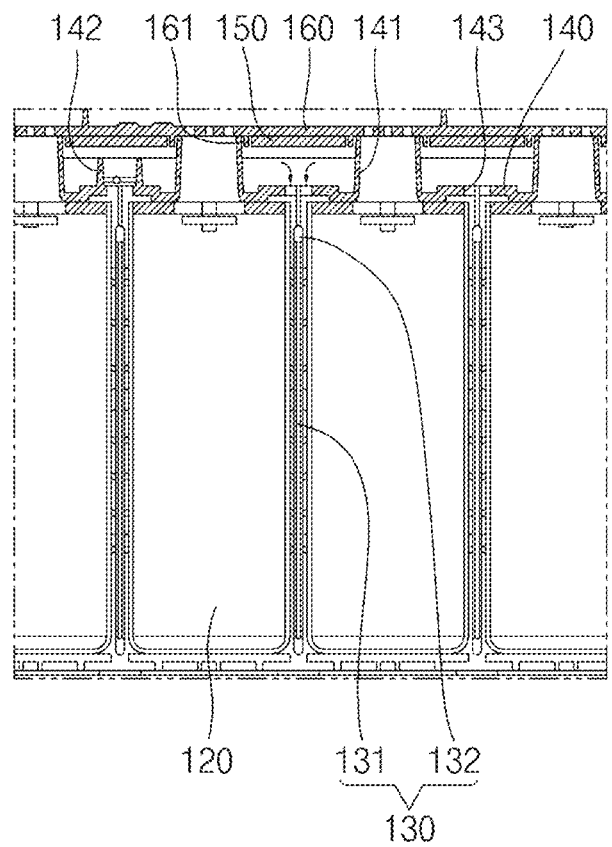
FIG. 14 is a partially enlarged view of the portion C of FIG. 10.

FIG. 10 is a cross-sectional view taken along the line C-C of FIG. 1. FIG. 11 is a perspective view illustrating a configuration of an insulation spacer 130 according to an embodiment of the present disclosure. FIGS. 12A to 12B are exploded perspective views illustrating example configurations of sheet parts of insulation spacers 130 according to an embodiment of the present disclosure. FIG. 13 is a cross-sectional view taken along the line D-D of FIG. 12A after the sheet parts are adhered to each other. FIG. 14 is a partially enlarged view of the portion C of FIG. 10.

The battery cells 120 and insulation spacers 130 may be alternately arranged on a top surface of the bottom plate 111 of the cover member 110. Here, the battery cells 120 may be arranged such that the long side surface of one of the battery cells 120 is spaced a distance (e.g., a reference or predetermined distance) apart from a long side surface of another (e.g., an adjacent) one of the battery cells 120, and the insulation spacers 130 are positioned between the neighboring battery cells 120. Here, the distance (e.g., a first distance) between the long side surfaces of the two neighboring battery cells 120 may be in a range from about 4 mm to about 6 mm. If the first distance is smaller than 4 mm, it is not easy to provide air layers between the battery cells 120 and the insulation spacers 130, thereby lowering cooling efficiency. If the first distance is greater than 6 mm, the energy storage module 100 may become unnecessarily bulky.

The insulation spacers 130 positioned between each of the battery cells 120 may prevent the battery cells 120 from contacting each other, thereby maintaining the cases 121 of the battery cells 120 in an electrically isolated state. Each of the insulation spacers 130 may have a planar size corresponding to that of the long side surface of one battery cell 120. For example, one surface of the insulation spacer 130 may face the long side surface of one battery cell 120, and the other surface of the insulation spacer 130 may face the long side surface of another battery cell 120.

In addition, the insulation spacer 130 and the long side surface of the battery cell 120 may be spaced apart by a distance (e.g., a second distance) to establish a passage for external air. The battery cell 120 may be cooled by the external air passing through the external air passage.

The insulation spacers 130 may include a sheet part (e.g., a sheet) 131 and an edge part (e.g., an edge) 132. The sheet part 131 may include a flame-retardant (or non-combustible) sheet that prevents (or substantially impedes) a fire from spreading to neighboring battery cells 120 and a heat-insulating sheet that prevents (or substantially impedes) heat from being propagated to neighboring battery cells 120 when a fire starts in any of the battery cells 120. In some embodiments, the sheet part 131 may include a heat-insulating first sheet 131a and a plurality of (e.g., two) flame-retardant (or non-combustible) second sheets 131b adhered to opposite surfaces of the first sheet 131a by one or more adhesion member(s) 131c. The sheet part 131 may have an increased heat insulating effect and may provide flame retardancy (and non-combustibility) by stacking multiple layers of the first sheet 131a and the second sheets 131b. For example, the insulation spacers 130 may prevent heat or flames from propagating to neighboring battery cells 120 through the stacked sheet parts 131 when the temperature of the battery cell 120 rises or flames are generated in the battery cell 120.

Here, the first sheet 131a and the second sheets 131b may have the same size (e.g., the same length and width). To facilitate movement of the fire extinguishing agent, a thickness of the insulation spacer 130 may not exceed 50% of the first distance (e.g., may not exceed 50% of the distance between the adjacent battery cells 120). For example, when the first distance is about 6 mm, the thickness of the insulation spacer 130 may not exceed about 3 mm. When the first distance is about 4 mm, the thickness of the insulation spacer 130 may not exceed about 2 mm. In one embodiment, the first sheet 131a may have a thickness in a range from about 1 mm to about 1.4 mm. In addition, each of the second sheets 131b may have a thickness in a range from about 0.1 mm to about 0.2 mm, and the adhesive member 131c may have a thickness of about 0.1 mm.

For example, the first sheet 131a may include (or may be formed of) ceramic paper, and the second sheets 131b may include (or may be formed of) MICA paper. In addition, the first sheet 131a may further include an aerogel. In this embodiment, because an air layer is sufficiently provided in the first sheet 131a, heat insulating efficiency can be increased. In addition, the first sheet 131a may include (or may be) ceramic paper made of a fiber-containing refractory insulating material. In addition, the first sheet 131a may include (or may be) bio-soluble fiber ceramic paper containing an alkaline earth metal, which is an eco-friendly high-temperature insulating material that is generally harmless to humans.

In addition, the sheet part 131 may have a configuration shown in FIG. 12A or FIG. 12B.

As shown in FIGS. 12A and 13, the adhesion member 131c is positioned between the opposite ends of the first sheet 131a and each of the second sheets 131b so that the sheet part 131 has a reference (or predetermined) width. The adhesion member 131c may attach the first sheet 131a and the second sheets 131b to each other. In addition, the adhesion member 131c may have the same length as the first sheet 131a and the second sheets 131b in a length direction. For example, opposite ends x1 of the first sheet 131a may be adhered to respective opposite ends x1 of the second sheets 131b by the adhesion member 131c.

The adhesion member 131c may have a width in a range from about 10 mm to about 20 mm. Here, if the width of the adhesion member 131c is smaller than about 10 mm, adhesion between the first sheet 131a and the second sheets 131b may be insufficient. If the width of the adhesion member 131c is greater than about 20 mm, an ignition probability may increase due to the adhesion member 131c.

The adhesion member 131c may have a variety of adhesive components or configurations, such as a double sided tape or an adhesive tape, but the adhesive components and configurations of the adhesion member 131c are not limited thereto.

The adhesion member 131c may attach (e.g., may only attach) the opposite ends x1 of the first sheet 131a to the second sheets 131b so that the first sheet 131a and the second sheets 131b are spaced apart from each other at a central portion x2 of the sheet part 131. As a result, air passages 131d may be established between the first sheet 131a and the second sheets 131b. In addition, if the sheet part 131 is compressed due to swelling of the battery cell(s) 120, the air passages 131d established at the central portion x2 of the sheet part 131 may reduce (or mitigate) compression of the sheet part 131.

As shown in FIG. 12B, according to another embodiment, the adhesion member 131c may be located at an area at (or adjacent to) top and bottom ends of the first sheet 131a to attach the first sheet 131a and the second sheets 131b to each other. In addition, the adhesion member 131c may have the same width as the first sheet 131a and the second sheets 131b in a width direction. For example, the top and bottom ends of the first sheet 131a may be respectively adhered to top and bottom ends of the second sheets 131b by the adhesion member 131c.

When the sheet part 131 has a width-direction size less than twice a height-direction size thereof, as shown in FIG. 12A, the adhesion member 131c may be attached to the opposite ends of the sheet part 131. However, when the width-direction size of the sheet part 131 is greater than or equal to twice the height-direction size thereof, an adhesion area (e.g., a vertical adhesion area) may be reduced relative to the overall area of the sheet part 131 due to an area occupied by the adhesion member 131c attached to the opposite ends of the sheet part 131, thereby lowering adhesion performance. Therefore, when the width-direction size of the sheet part 131 is greater than twice the height-direction size, the adhesion member 131c may be applied to the top and bottom ends thereof to increase the adhesion area, thereby improving the adhesion performance. The configuration of the sheet part 131 shown in FIG. 12B may be substantially the same as the sheet part 131 shown in FIGS. 12A and 13, except for positions of the adhesion member(s) 131c.

Further, when the adhesion member 131c is applied to the top and bottom ends of the sheet part 131, the adhesion performance is improved, and in some embodiments, no edge part (described below) may be separately required (e.g., an edge part may be omitted).

In some embodiments, an edge part 132 may be provided along peripheral edges of the sheet part 131. The edge part 132 may include (or may be made of) a plastic material, such as a general polyethylene or polypropylene, and may be coupled to edges of the sheet part 131 by using a double injection process to fix the shape of the sheet part 131. In some embodiments, the edge part 132 may have a width in a range from about 3 mm to about 6 mm. If the width of the edge part 132 is smaller than about 3 mm, the sheet part 131 may not be easily fixed, and if the width of the edge part 132 is greater than about 6 mm, an ignition probability of the edge part 132 made of a plastic material may be increased.

As described above, when a fire extinguishing agent is applied from top portions of the insulation spacers 130, the fire extinguishing agent may move downwardly along the surfaces of the sheet part 131. Therefore, the fire extinguishing agent may contact the case 121 of the adjacent battery cells 120, thereby performing extinguishing and cooling operations on the battery cells 120. Hereinafter, movement of the fire extinguishing agent will be described in greater detail.

As shown in FIG. 14, the top plate 140 may further include the openings 143 respectively located to correspond to (e.g., located over or above) the insulation spacers 130. Accordingly, the fire extinguishing agent, when emitted from the extinguisher sheet 150, may pass through the top plate 140 through the openings 143 of the top plate 140 to reach the insulation spacers 130. In addition, the fire extinguishing agent may move along surfaces of the insulation spacers 130 that face the case 121 of the adjacent battery cells 120, thereby extinguishing any fire and cooling the battery cells 120. The fire extinguishing agent is emitted by the extinguisher sheet 150 located over one or more of the battery cells 120, the temperature of which is higher than a reference temperature. Therefore, the fire extinguishing agent may be sprayed from a top portion of the battery cell 120 having an elevated temperature. In addition, because the fire extinguishing agent moves along the surfaces of the insulation spacers 130 positioned at front and rear sides of the corresponding battery cell 120, both extinguishing and cooling of the corresponding battery cell 120 can be performed.

Hereinafter, a configuration of an energy storage module according to another embodiment of the present disclosure will be described.

Figure 15:
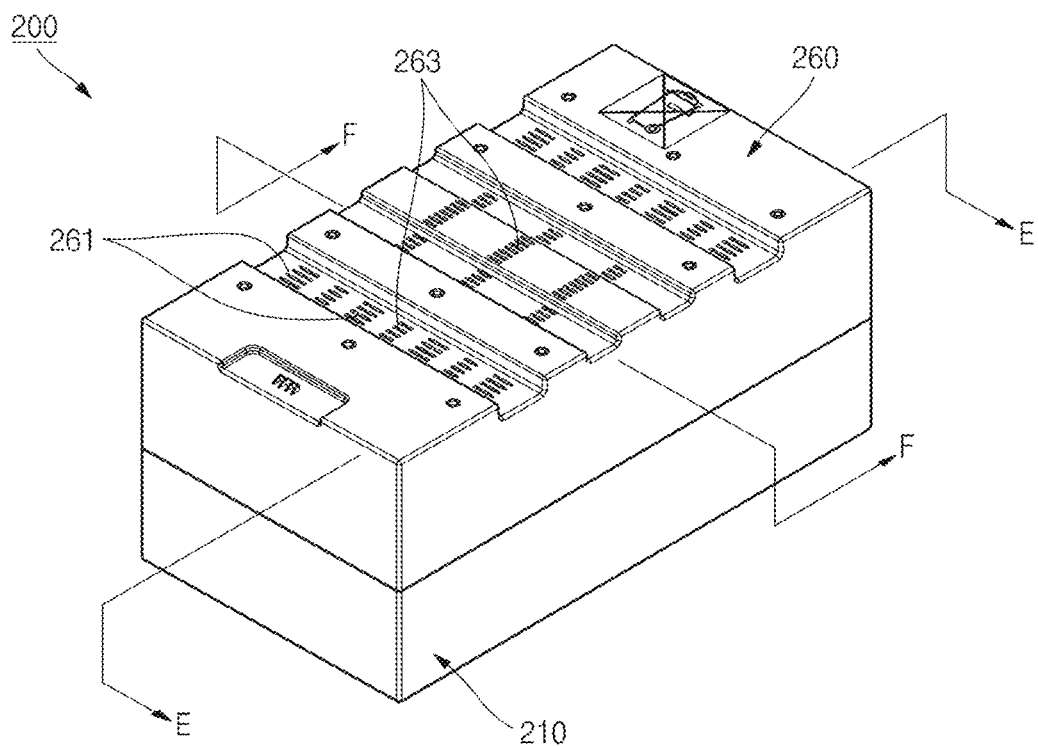
FIG. 15 is a perspective view of an energy storage module according to another embodiment of the present disclosure.
Figure 16:
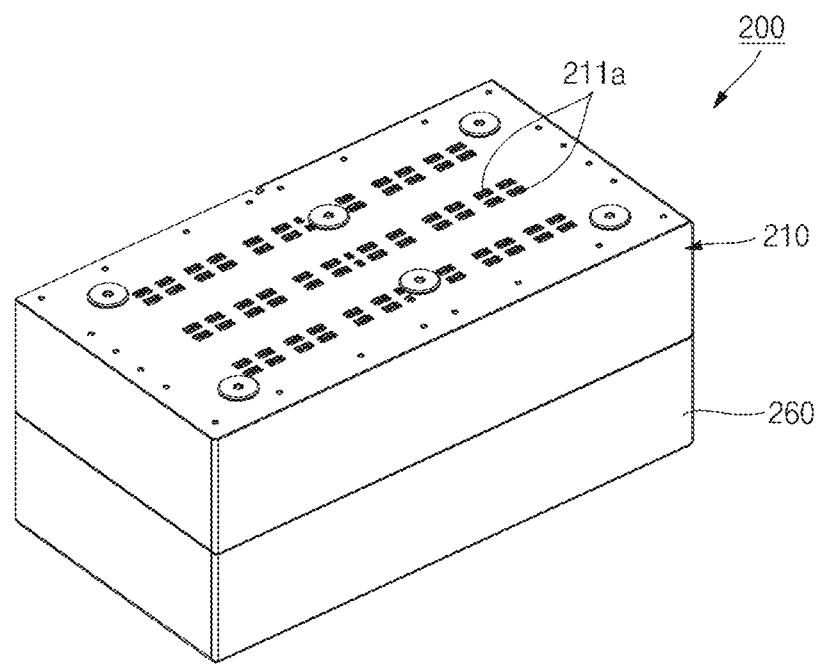
FIG. 16 is a perspective bottom view of the energy storage module shown in FIG. 15.
Figure 17:
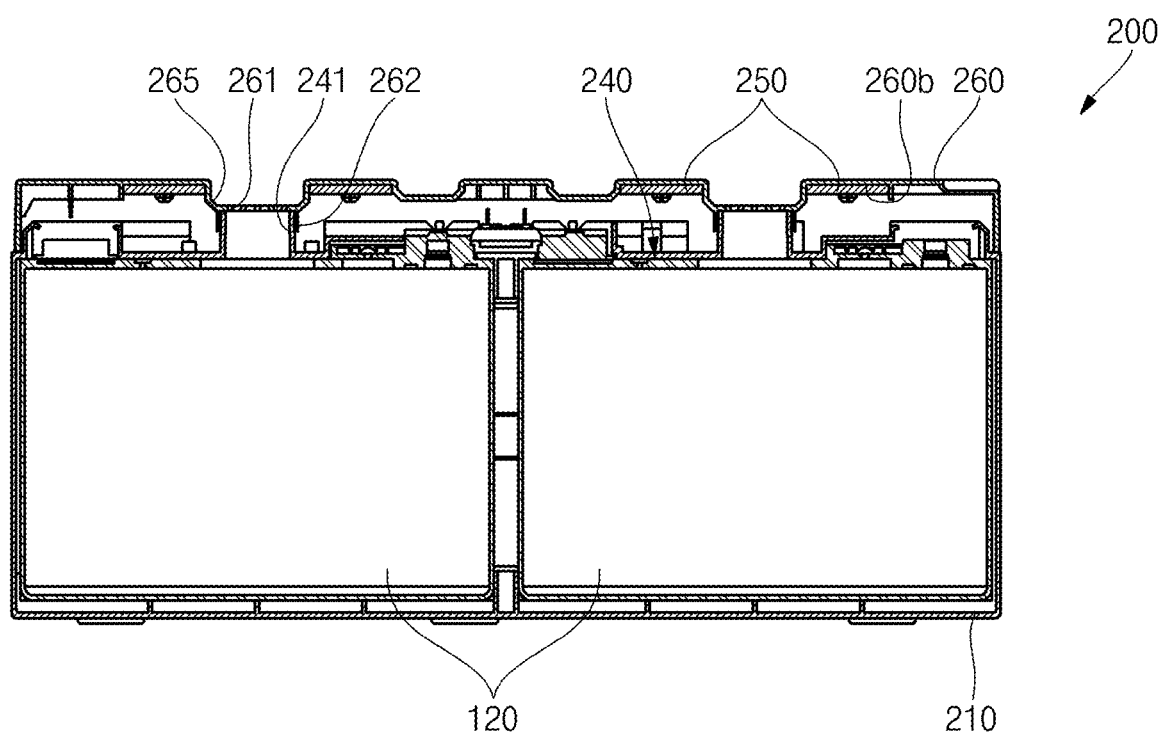
FIG. 17 is a cross-sectional view taken along the line E-E of FIG. 15.
Figure 18:
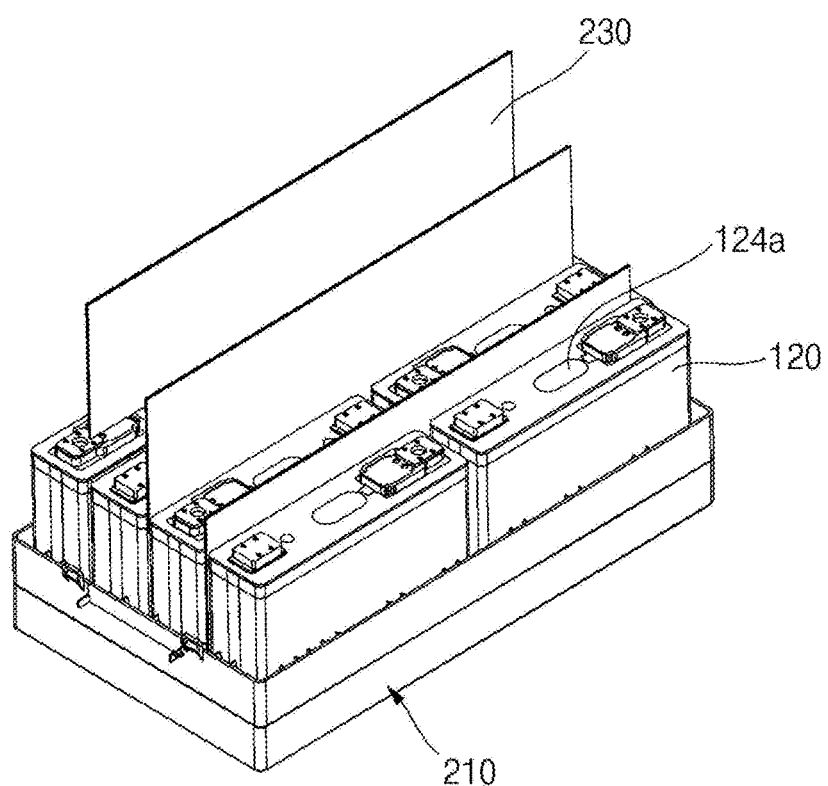
FIG. 18 is a perspective view of battery cells and insulation spacers arranged in a cover member of the energy storage module shown in FIGS. 15-17.

FIG. 15 is a perspective view of an energy storage module according to another embodiment of the present disclosure. FIG. 16 is a perspective bottom view of the energy storage module shown in FIG. 15, FIG. 17 is a cross-sectional view taken along the line E-E of FIG. 15, and FIG. 18 is a perspective view illustrating battery cells and insulation spacers arranged on a cover member of the energy storage module shown in FIGS. 15-17.

Referring to FIGS. 15-18, the energy storage module 200 according to another embodiment of the present disclosure may include a cover member 210, battery cells 120, insulation spacers 230, a top plate 240, an extinguisher sheet 250, and a top cover 260.

The cover member 210, the top plate 240, the extinguisher sheet 250, and the top cover 260 may be similarly configured to those of the energy storage module 100 described above. In addition, the battery cells 120 may be the same (or substantially the same) as those of the energy storage module 100. Accordingly, the following description will focus on differences between the energy storage module 200 and the energy storage module 100.

The cover member 210 may include a bottom plate 211, an end plate (or a plurality of end plates) 212, and a side plate (or a plurality of side plates) 213 which together form a space in which the battery cells 120 and the insulation spacers 230 are alternately arranged with the battery cells 120 on the bottom plate 211. In addition, the cover member 210 may fix positions of the battery cells 120 and the insulation spacers 230 and may protect the battery cells 120 from external impacts. In addition, the bottom plate 211 may further include openings (e.g., through-holes) 211a, through which the fire extinguishing agent from the extinguisher sheet 250 and the air moving along the exterior surfaces of the insulation spacers 230 are exhausted. The openings 211a may be positioned to correspond to the insulation spacers 230.

The insulation spacers 230 are positioned between adjacent ones of the battery cells 120 to prevent the battery cells 120 from contacting one another, thereby maintaining the cases 121 of the battery cells 120 in electrically isolated states. Each of the insulation spacers 230 may have short side surfaces, each having a planar size sufficient to entirely cover the long side surfaces of two adjacent battery cells 120. For example, one of the insulation spacers 230 may be positioned between each group of four adjacent battery cells 120, which are arranged such that long side surfaces of two of the four battery cells 120 face each other. In addition, a distance is maintained between each of the insulation spacers 230 and the battery cells 120 to establish external air passages and/or fire extinguishing agent passages, thereby allowing for cooling of the battery cells 120. The insulation spacers 230 may include (or may be made of) a flame-retardant (or non-combustible) sheet that prevents (or substantially mitigates) a fire from spreading to neighboring battery cells and a heat-insulating sheet that prevents (or substantially mitigates) heat from propagating to neighboring battery cells when a fire outbreaks in any of the battery cells 120. The configurations of the insulation spacers 230 will be described in more detail below.

The top plate 240 may be coupled to atop portion of the cover member 210. The top plate 240 may be coupled to the cover member 210 while covering top portions of the battery cells 120.

The top plate 240 includes ducts 241 respectively corresponding to the vents 124a located on a top surface of each of the battery cells 120. The ducts 241 may be arranged in one direction, for example, in a length direction of the top plate 240. Accordingly, if the vent 124a ruptures, the gas discharged through the vent 124a of the battery cell 120 may move upwardly along the ducts 241 of the top plate 240.

The extinguisher sheet 250 is positioned between the top plate 240 and the top cover 260. The extinguisher sheet 250 may include a plurality of planar sheets located at opposite sides of the ducts 241 of the top plate 240 and extending in a length direction of the top plate 240. The extinguisher sheet 250 may be mounted on a bottom surface 260b of the top cover 260. Here, the length direction may refer to a direction in which the ducts 241 of the top plate 240 extend.

The top cover 260 is coupled to the top portion of the top plate 240. The top cover 260 may cover the top plate 240 and the extinguisher sheet 250, thereby protecting the top plate 240 and the extinguisher sheet 250 from external impacts applied to a top surface 260a of the top cover 260. In addition, the top cover 260 may include discharge openings (e.g., discharge holes) 261. In addition, the top cover 260 may also include protrusion parts (e.g., protrusions) 262 spaced apart from (e.g. may extend around) the outer periphery of respective ones of the discharge openings 261. The protrusion parts 262 may protrude downwardly. The ducts 241 may be respectively coupled to (e.g., may respectively extend into) the interior of the protrusion parts 262. Each of the discharge openings 261 may include a plurality discharge holes arranged in one direction, for example, in a length direction of the top cover 260. In addition, the discharge openings 261 may be positioned to correspond to the ducts 241 of the top plate 240. In addition, the discharge openings 261 may also be provided as a plurality of openings passing through top and bottom surfaces of the top cover 260 and spaced apart from one another. Accordingly, if the vent 124a ruptures, the gas discharged from the vent 124a of the battery cell 120 may be discharged to the exterior side along the duct 241 of the top plate 240 and the discharge opening 261 of the top cover 260.

In addition, the top cover 260 may further include openings (e.g., through-holes) 263, through which the fire extinguishing agent of the extinguisher sheet 250 is exhausted and the air moving along the exterior surfaces of the insulation spacers 230 is exhausted. The openings 263 may be positioned to respectively correspond to the insulation spacers 230.

In addition, recess parts (e.g., recessed portions or recesses) 265, each having a lower height (e.g., a lower height above the battery cells 120) than other areas of the top cover 260, may be provided in a length direction of the top cover 260, and the discharge openings 261 may be arranged at the recess parts 265. With this configuration, the gases discharged through the ducts 241 and the discharge opening 261 may gather in the recess parts 265, and the gas may be discharged to the exterior side by using, for example, a separate fan or a suction structure (e.g., a vacuum), thereby allowing the gas generated by the battery cells 120 to be discharged quickly.

Hereinafter, configurations and operations of battery cells 120 and insulation spacers 230 in an energy storage module according to another embodiment of the present disclosure will be described.

Figure 19A:
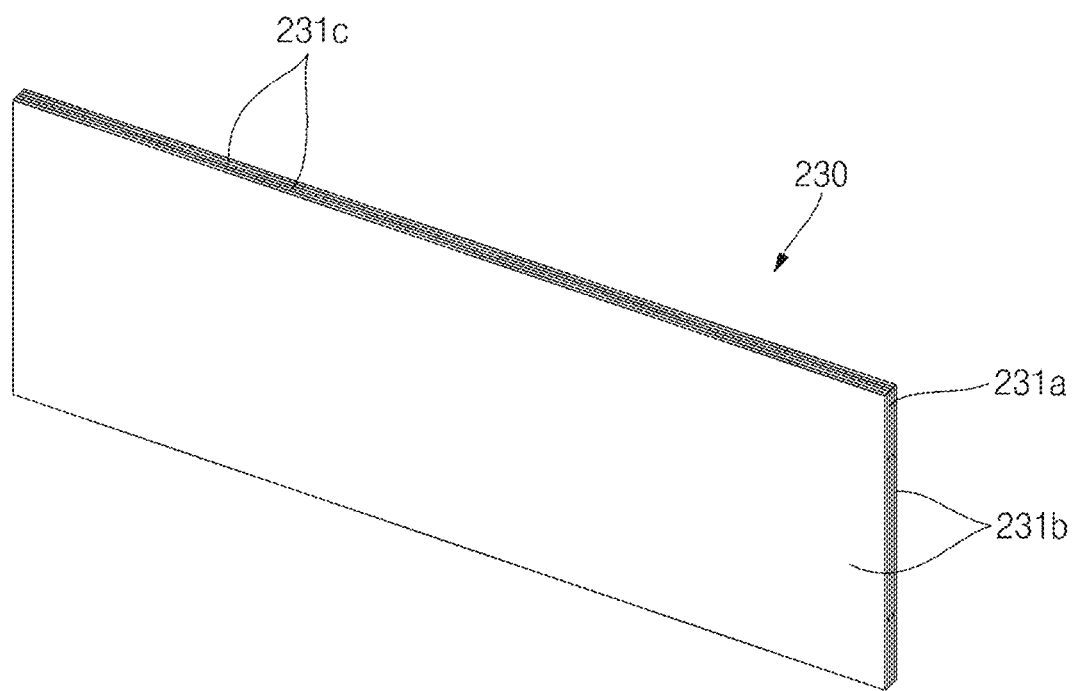
FIGS. 19A and 19B are a perspective view and a cross-sectional view, respectively, illustrating insulation spacers in the energy storage module shown in FIGS. 15-18.
Figure 19B:
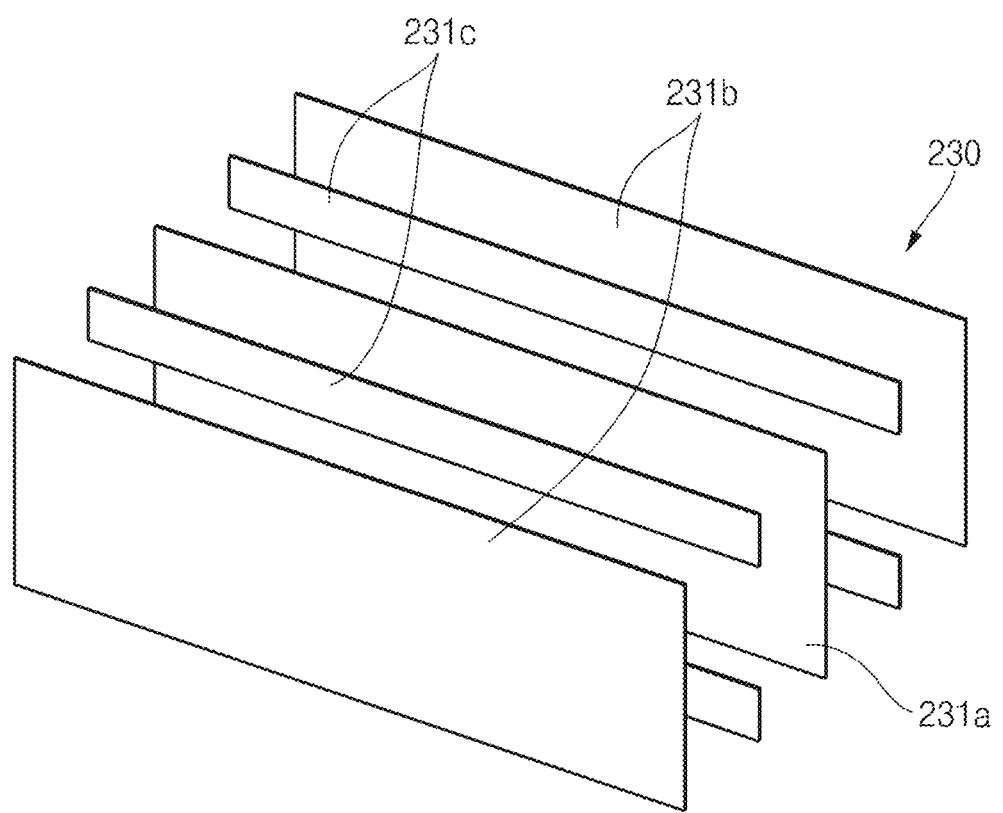
Figure 20:
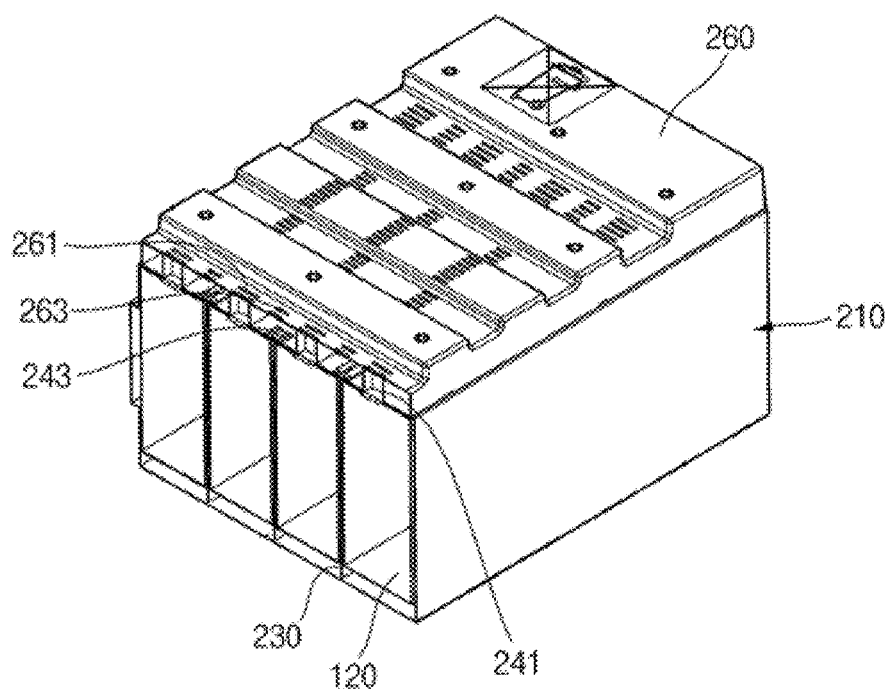
FIG. 20 is a cross-sectional view taken along the line F-F of FIG. 15.

FIGS. 19A and 19B are a perspective view and a cross-sectional view, respectively, illustrating configurations of insulation spacers to be used in the energy storage module 200 according to another embodiment of the present disclosure, and FIG. 20 is a cross-sectional view taken along the line F-F of FIG. 15.

The battery cells 120 and the insulation spacers 230 may be alternately arranged on a top surface of the bottom plate 211 of the cover member 210. Each of the insulation spacers 230 may have short side surfaces, each having a planar size sufficient to entirely cover long side surfaces of two adjacent battery cells 120. For example, one surface of one of the insulation spacers 230 may entirely cover the long side surfaces of two adjacent battery cells 120, and the other surface of the one insulation spacer 230 may entirely cover the long side surfaces of two other adjacent battery cells 120. For example, one of the insulation spacers 230 may be positioned between four battery cells 120 that are arranged such that long side surfaces of two battery cells 120 face long side surfaces of two other battery cells 120.

In addition, long side surfaces of the battery cells 120 may be spaced apart from long side surfaces of facing battery cells 120, and the insulation spacers 230 may be positioned between each of the long side surfaces of the battery cells 120.

A distance (e.g., a first distance) between the long side surfaces of the facing battery cells 120 may be in a range from about 3.5 mm to about 4.5 mm. If the first distance is smaller than about 3.5 mm, air layers (e.g., air passages) may not be provided between each of the battery cells 120 and the insulation spacers 230, thereby lowering cooling efficiency. If the first distance is greater than about 4.5 mm, the energy storage module 200 may become unnecessarily bulky.

The insulation spacers 230, positioned between each facing pair of the battery cells 120, may prevent the battery cells 120 from contacting each other, thereby maintaining the cases 121 of the battery cells 120 in electrically isolated states. In addition, the insulation spacer 230 and the long side surfaces of battery cells 120 are spaced apart from each other to establish external air passages. Here, the battery cells 120 may be cooled by external air moving along (or through) the external air passages.

The insulation spacers 230 may consist of sheets 231 (e.g., only sheets 231) without separate edge parts. The insulation spacers 230 may include a flame-retardant (or non-combustible) sheet that prevents (or substantially mitigates) the fire from spreading to neighboring battery cells 120 and a heat-insulating sheet that prevents (or substantially mitigates) heat from propagating to neighboring battery cells 120. For example, the sheet parts 231 of the insulation spacers 230 may include a heat-insulating first sheet 231a and two flame-retardant (or non-combustible) second sheets 231b respectively adhered to opposite surfaces of the first sheet 231a by using one or more adhesive member(s) 231c. The first sheet 231a and the second sheets 231b have the same (or substantially the same) size. A thickness of the insulation spacer 230 may not exceed about 50% of the first distance to facilitate movement of the fire extinguishing agent, which will be described in more detail below.

The adhesion member 231c may be positioned between the first sheet 231a and the second sheets 231b at a distance (e.g., a reference distance) from top and bottom ends of the first sheet 231a to attach the first sheet 231a and the second sheets 231b to each other. In addition, the adhesion member 231c may have the same (or substantially the same) width as the first sheet 231a and the second sheets 231b in their width directions. For example, the top and bottom ends of the first sheet 231a may be respectively adhered to top and bottom ends of the second sheet 231b by the adhesion member 231c.

When the sheet part 231 has a width-direction size greater than twice a height-direction size thereof, the adhesion member 231c may be applied to the top and bottom ends thereof to improve adhesion performance. For example, when the sheet part 231 has the width-direction size greater than twice the height-direction size thereof, such as in the embodiment shown in FIG. 12A, the adhesion performance may be lowered when the adhesion member 231c is applied to opposite ends of the sheet part 131, due to a reduction in the adhesion area. In this case, the insulation spacer 230 may have the same (or substantially the same) configuration as the sheet part 131 as shown in FIG. 12B.

As discussed above, if a fire extinguishing agent is applied from top portions of the insulation spacers 230, the fire extinguishing agent may move downwardly along the surfaces of the sheet part 231. Therefore, the fire extinguishing agent may contact the case 121 of the adjacent battery cells 120, thereby extinguishing any fire and cooling the battery cells 120. Hereinafter, the movement of the fire extinguishing agent and the cooling of the battery cells 120 using the air will be described in greater detail.

As shown in FIG. 20, the top plate 240 may further include openings (e.g., opening holes) 243 located to respectively correspond to the insulation spacers 230. Accordingly, the fire extinguishing agent emitted from the extinguisher sheet 250 may pass through the top plate 240 through the openings 243 of the top plate 240 to reach the insulation spacers 230. In addition, the fire extinguishing agent may move along surfaces of the insulation spacers 230 that face the case 121 of the battery cells 120, thereby extinguishing and cooling the battery cells 120. The fire extinguishing agent is emitted (or sprayed) from the extinguisher sheet 250 above one or more of the battery cells 120, the temperature of which is higher than a reference temperature. Therefore, the fire extinguishing agent may be sprayed from a top portion of the battery cell 120, the temperature of which has increased. In addition, because the fire extinguishing agent moves along the surfaces of the insulation spacers 230 positioned at front and rear sides of the corresponding battery cell 120, the corresponding battery cell 120 can be both extinguished and cooled.

In addition, the top cover 260 may further include openings 263 that pass through top and bottom surfaces of the top cover 260 and are located to respectively correspond to the openings 243. For example, the openings 263 may respectively correspond to the insulation spacers 230.

In addition, the bottom plate 211 of the cover member 210 may also include openings 211a located to respectively correspond to the insulation spacers 230. Thus, air introduced through the openings 263 of the top cover 260 and the openings 243 of the top plate 240 may move along spaces provided between the insulation spacers 230 and the battery cells 120 to be discharged through the openings 211a of the bottom plate 211. Of course, the movement of the air (e.g., the airflow direction) may be reversed. In such a way, air passages may be provided by the openings 211a, 263, and 243, thereby improving cooling efficiency.

Hereinafter, the active material composition of the battery cell 120 used in the energy storage modules 100 and 200 according to an embodiment of the present disclosure will be described in greater detail.

Figure 21A:
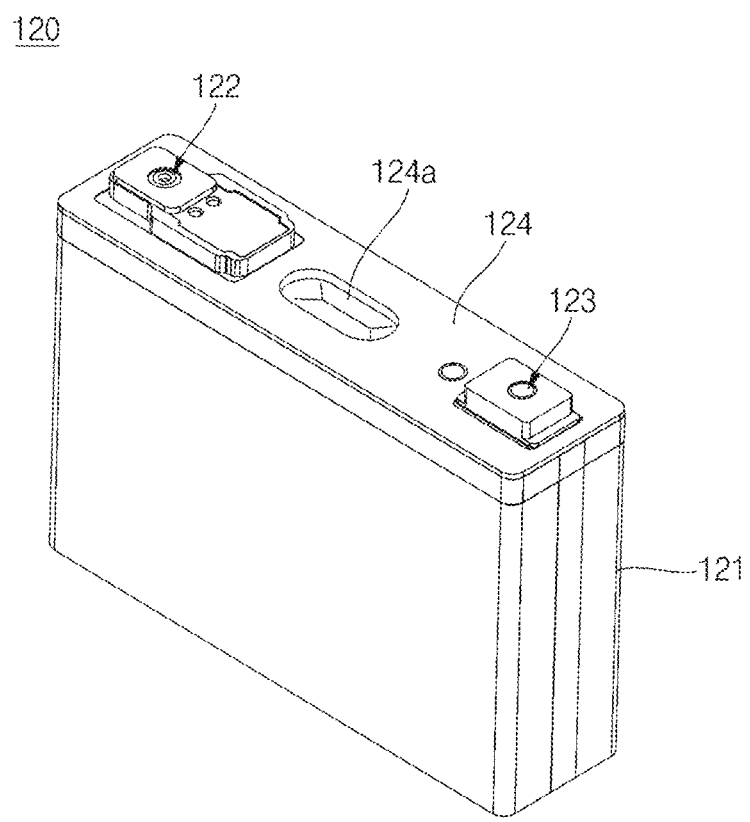
FIGS. 21A and 21B are a perspective view and a cross-sectional view, respectively, of a battery cell to be included in an energy storage module according to an embodiment of the present disclosure.
Figure 21B:
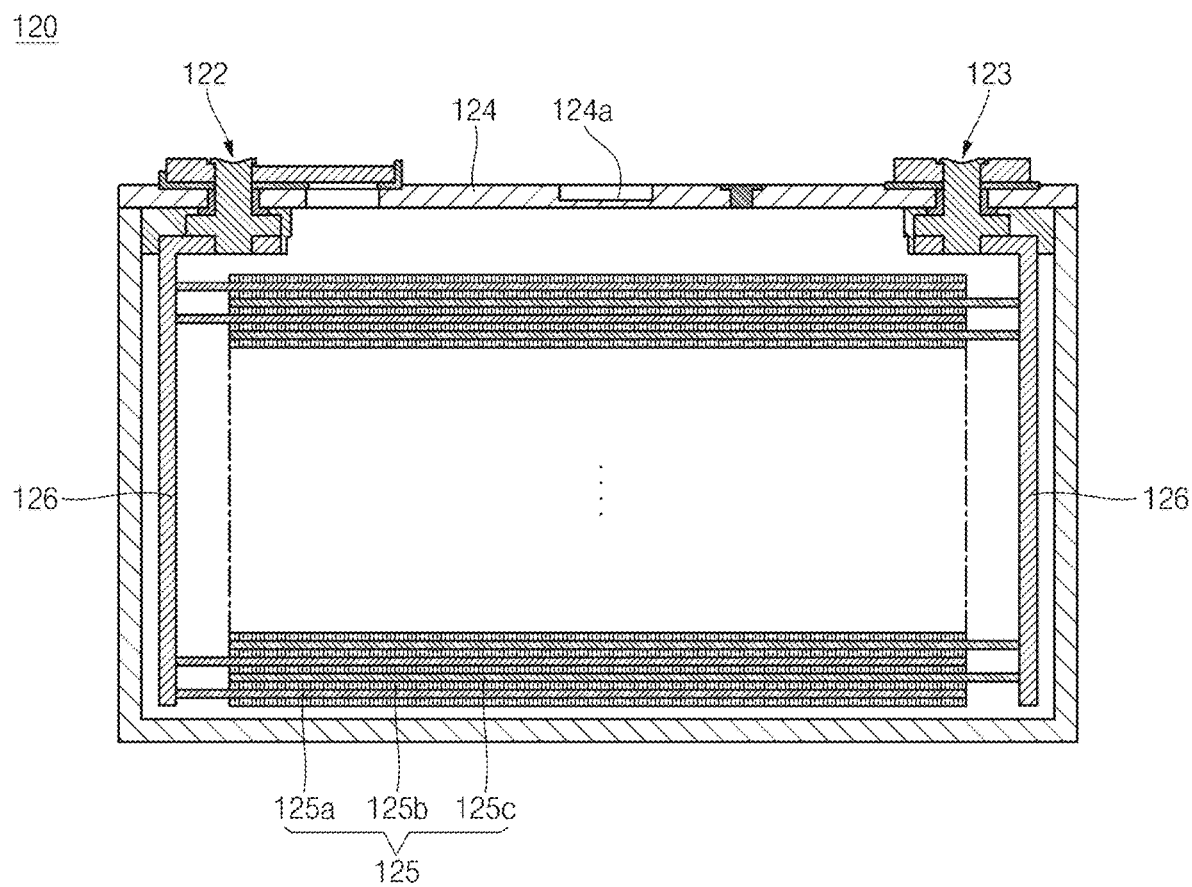

FIGS. 21A and 21B area perspective view and a cross-sectional view, respectively, of a battery cell used in an energy storage module according to an embodiment of the present disclosure.

Referring to FIGS. 21A and 21B, a battery cell 120 is configured such that an electrode assembly 125 is accommodated in a case 121 and a cap plate 124 covers a top portion of the case 121. In addition, a vent 124a having a smaller thickness than other regions is located roughly at the center of the cap plate 124. A duct 141 of the top plate 140 is located to correspond to a top portion of a vent 124a, as described above.

In addition, the electrode assembly 125 may be electrically connected to a first electrode terminal 122 and a second electrode terminal 123 located on the cap plate 124 through a pair of current collectors 126. For convenience sake, in the following description, the first electrode terminal 122 will be referred to as a negative electrode terminal and the second electrode terminal 123 will be referred to as a positive electrode terminal, but polarities thereof may also be reversed.

The electrode assembly 125 may include a negative electrode 125a, a positive electrode 125b positioned to face the negative electrode 125a and a separator 125c positioned between the negative electrode 125a and the positive electrode 125b, and the electrode assembly 125 may be accommodated in the case 121 together with an electrolyte.

Here, the negative electrode 125a may include a negative electrode current collector, a negative electrode active material layer positioned on the negative electrode current collector, and a negative electrode function layer positioned on the negative electrode active material layer.

Compared to a case where the negative electrode function layer includes spherical polyethylene particles, in a case where the negative electrode function layer includes flake-shaped polyethylene particles, the reaction depending on the temperature may speed up under the same reaction conditions, thereby further increasing a safety improving effect of a lithium secondary battery.

The flake-shaped polyethylene particles yet to be melted may be distributed to cover pores over a thinner and wider area than the spherical polyethylene particles yet to be melted. If the polyethylene particles are melted at a temperature higher than a set or predetermined temperature to shut down ion passages, a larger electrode plate area may be shut down by the flake-shaped polyethylene particles than by the melted spherical polyethylene particles, thereby increasing the reaction speed.

That is to say, during thermal runaway of a battery cell, the polyethylene particles included in the negative electrode function layer are melted to shut down ion passages, so that ion movement is restricted and a shut-down function is manifested, thereby preventing additional electrochemical reactions from taking place (or thereby reducing a likelihood or degree of the additional electrochemical reactions).

Figure 24:
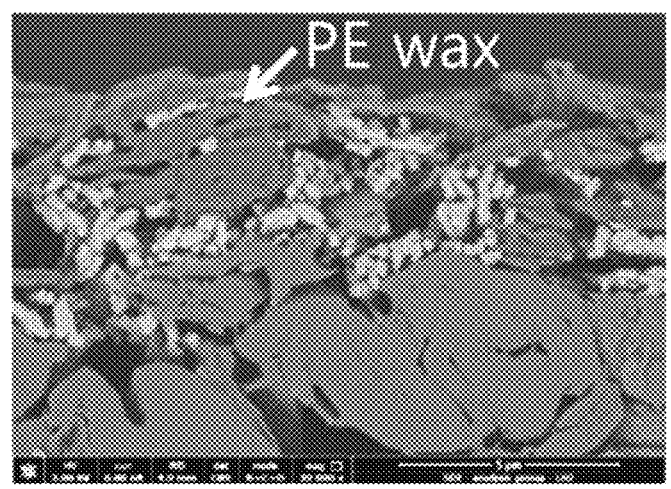
FIG. 24 is a SEM image of an electrode composition according to an embodiment of the present disclosure.
Figure 25:
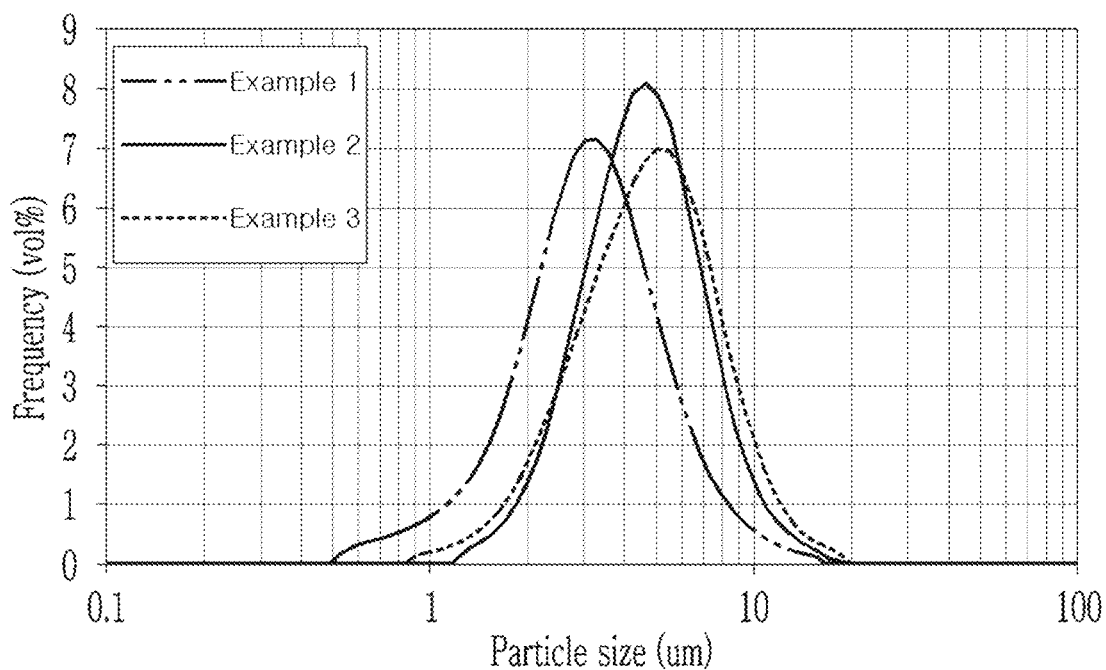
FIG. 25 is a graph showing particle size distribution analysis results of flake-shaped polyethylene particles contained in electrode compositions prepared according to Examples 1 to 3.

For example, as confirmed from FIG. 24, since the flake-shaped polyethylene particles according to an embodiment of the present disclosure are distributed over pores in the composition of the negative electrode function layer throughout a thin and wide area, they are quickly melted down during thermal runaway due to thermal/physical impacts, thereby demonstrating an excellent effect in blocking ion passages.

In general, polyethylene may be categorized by density into high-density polyethylene (HDPE) (Density: 0.94 g/cc to 0.965 g/cc), medium-density polyethylene (MDPE) (Density: 0.925 g/cc to 0.94 g/cc), low-density polyethylene (LDPE) (Density: 0.91 g/cc to 0.925 g/cc), and very low density polyethylene (VLDPE) (Density: 0.85 g/cc to 0.91 g/cc).

The flake-shaped polyethylene particles may be used alone or in mixture of two or more polyethylene (PE) polymers, such as, for example, HDPE, MDPE, or LDPE.

The flake-shaped polyethylene particles included in the negative electrode function layer positioned on the negative electrode active material layer may have an average particle diameter (D50) in a range from 1 μm to 8 μm, specifically from 2 μm to 6 μm.

Unless defined otherwise in the specification of the present disclosure, an average particle diameter (D50) may be measured using any suitable method generally used in the art such as, for example, by utilizing a particle size analyzer, or by utilizing a transmission electron microscopic (TEM) image or a scanning electron microscopic (SEM) image. Also, the D50 may be easily measured by analyzing data measured by a measuring device using a dynamic light-scattering method to count the number of particles for each particle size range and calculating an average value thereof.

In some embodiments, the D50 value may correspond to a particle size at which half of the mass (or volume) of the particles have a larger particle size and the other half of the mass (or volume) of the particles have a smaller particle size.

Meanwhile, a ratio of a major axis length to a minor axis length of the flake-shaped polyethylene particles may be in a range from 1 to 5, for example, 1.1 to 4.5, or 1.2 to 3.5.

In addition, the flake-shaped polyethylene particles may have a thickness in a range from 0.2 μm to 4 μm, or between 0.3 μm and 2.5 μm, for example, between 0.3 μm and 1.5 μm.

Figure 22:
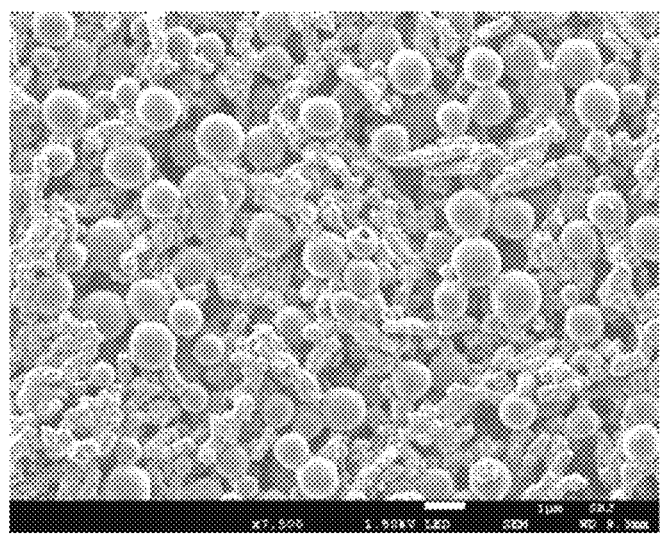
FIG. 22 is a scanning electron microscope (SEM) image of polyethylene spherical particles in an aqueous dispersion.
Figure 23:
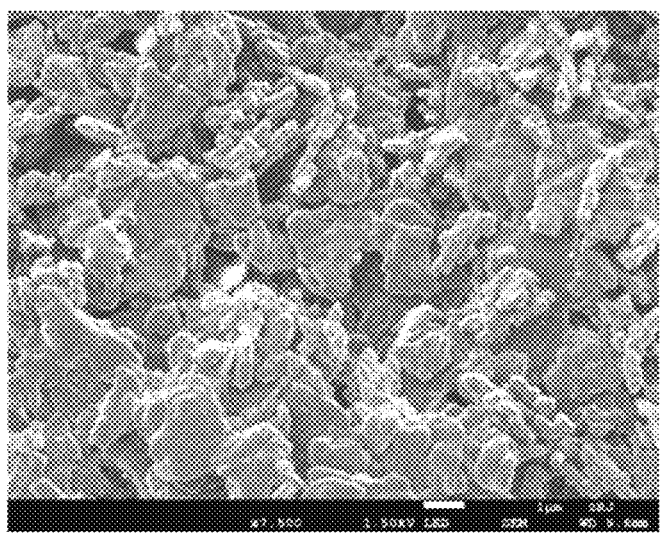
FIG. 23 is a SEM image of polyethylene spherical particles according to an embodiment of the present disclosure.

As shown in FIG. 23, the polyethylene particles according to the present disclosure a flake-shape and have a different shape from general polyethylene particles having a spherical shape in a water-dispersible state, as shown in FIG. 22. An average particle size of the flake-shaped polyethylene particles may be defined to be D50, which is a particle size at 50% of a volume ratio (or a mass ratio) in a cumulative size-distribution curve.

The negative electrode function layer may further include inorganic particles and a binder.

The flake-shaped polyethylene particles and the inorganic particles and the binder may be contained in the negative electrode function layer in a weight ratio in a range from 80:20 to 99:1, for example, 85:15 to 97:3.

If the content (e.g., amount or weight ratio) of the flake-shaped polyethylene particles and the inorganic particles is within the range stated above, cycle-life characteristics and output power characteristics of rechargeable lithium battery cells including the same can be obtained or improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite or combinations thereof, but aspects of the present disclosure are not limited thereto. In addition to the inorganic particles, the negative electrode function layer may further include organic particles including an acryl compound, an imide compound, an amide compound or combinations thereof, but aspects of the present disclosure are not limited thereto.

The inorganic particles may have spherical shapes, sheet-shapes, cubic shapes or amorphous shapes. An average particle diameter (e.g., D50) of the inorganic particles may be in a range from about 1 nm to about 2500 nm. Within the range stated above, the average particle diameter of the inorganic particles may be in a range from about 100 nm to about 2000 nm, or from about 200 nm to about 1000 nm, for example, from about 300 nm and about 800 nm. The average particle diameter of the inorganic particles may be a particle size (D50) at 50% of a volume ratio (or a mass ratio) in a cumulative particle size-distribution curve.

The negative electrode function layer may have a thickness in a range from 1 μm to 10 μm, or, for example, between 3 μm and 10 μm.

A ratio of the thickness of the negative electrode active material layer to the thickness of the negative electrode function layer may be in a range from 50:1 to 10:1, for example, 30:1 to 10:1.

If the thickness of the negative electrode function layer is within the foregoing range, thermal stability of the resultant rechargeable lithium battery can be remarkably improved while maintaining excellent cycle life characteristics.

In some embodiments, if the thickness ratio of the negative active material layer to the negative electrode function layer is within the range stated above, thermal stability of the resultant rechargeable lithium battery can be improved while minimizing or reducing a reduction in the energy density.

Usable examples of the negative electrode current collector may include a copper foil, a nickel foil, a stainless steel foil, a titanium foil, a nickel foam, a copper foam, a polymer substrate coated with a conductive metal, or a combination thereof.

Usable examples of the negative electrode active material may include a material capable of reversibly intercalating/deintercalating lithium ions, a lithium metal, a lithium metal alloy, a material being capable of doping/undoping lithium, or a transition metal oxide.

Examples of the material capable of reversibly intercalating and deintercalating the lithium ions may include a carbon material, e.g., any suitable carbon-based negative electrode active material generally used in a lithium secondary battery. Representative examples of the carbon-based negative electrode active material may include crystalline carbon, amorphous carbon, and mixtures thereof. Examples of the crystalline carbon may include graphite, such as amorphous, sheet-shaped, flake-shaped, spherical shaped, or fiber-shaped natural graphite or artificial graphite. Examples of the amorphous carbon may include soft carbon or hard carbon, a mesophase pitch carbonized product, fired coke, or the like.

The crystalline carbon may include graphite of non-shaped (amorphous), sheet-shaped, flake-shaped, spherical-shaped, and/or fiber-shaped natural graphite and/or artificial graphite. The amorphous carbon may be a soft carbon, a hard carbon, mesophase pitch carbide, fired coke, and/or the like.

Usable examples of the lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping/undoping lithium may include a silicon-based material, e.g., Si or $SiO_x$ ($0<x<2$), an Si-Q alloy (wherein the Q is an element selected from the group consisting of an alkali metal, an alkaline-earth metal, Group 13 to 16 elements, a transition metal, a rare earth element, or a combination thereof, and is not Si), a Si—C composite, Sn, $SnO_2$, Sn—R (wherein the R is an element selected from the group consisting of an alkali metal, an alkaline-earth metal, Group 13 to 16 elements, a transition metal, a rare earth element, or a combination thereof, and is not Sn), a Sn—C composite, and the like, and at least one of which may be used in a mixture with $SiO_2$. Usable examples of the elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The transition metal oxide may include a lithium titanium oxide.

In the negative electrode active material layer, the negative electrode active material may be included in an amount in a range from 95 wt % to 99 wt % based on the total weight of the negative active material layer.

Optionally, the negative electrode active material layer may further include a negative electrode conductive material and a negative electrode binder.

Each of the negative electrode conductive material and the negative electrode binder may be included in an amount in a range from 1 wt % to 5 wt % based on the total weight of the negative active material layer.

The negative electrode conductive material is used to improve the conductivity (e.g., electrical conductivity) of a negative electrode. Any suitable electrically conductive material may be used as the negative electrode conductive material, unless the material causes a chemical change (e.g., an undesirable or unwanted change to any of the components of the rechargeable lithium battery). Examples of the negative electrode conductive material may include a carbon-based material, such as natural graphite, artificial graphite, carbon black, acetylene black, ketjen black, carbon fiber and the like; a metal-based material, such as a metal powder or a metal fiber and the like of copper, nickel, aluminum, silver, and the like; a conductive polymer, such as a polyphenylene derivative and the like; or a mixture thereof.

The negative electrode binder may serve to improve binding properties of the negative active material particles with one another and with a current collector. Examples of the negative electrode binder may include a non-water-soluble binder, a water-soluble binder, an amphiprotic binder, or a combination thereof.

Examples of the non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidenfluoride, polyethylene, polypropylene, polyamideimide, polyimide, or a combination thereof.

Examples of the water-soluble binder may include a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

Examples of the amphiprotic binder may include an acrylated styrene-based rubber.

When the water-soluble binder is used as the negative electrode binder, a cellulose-based compound may be further used to provide viscosity. Examples of the cellulose-based compound may include one or more of carboxylmethyl cellulose, hydroxypropylmethyl cellulose, methyl cellulose, or alkali metal salts thereof. The alkali metal may be Na, K, and/or Li. The cellulose-based compound may be included in an amount of 0.1 to 3 parts by weight based on 100 parts by weight of the negative electrode active material.

The positive electrode of the lithium secondary battery according to an embodiment of the present disclosure may include a positive electrode active material layer including a first positive electrode active material including at least one composite oxide of lithium and a metal of cobalt, manganese, nickel, or a combination thereof, and a second positive electrode active material including a compound represented by the Chemical Formula (1).

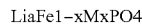
$$Li_aFe_{1-x}M_xPO_4 \tag{1}$$

wherein 0.90≤a≤1.8, 0≤x≤0.7, and M is Mg, Co, Ni or combinations thereof.

Figure 29:
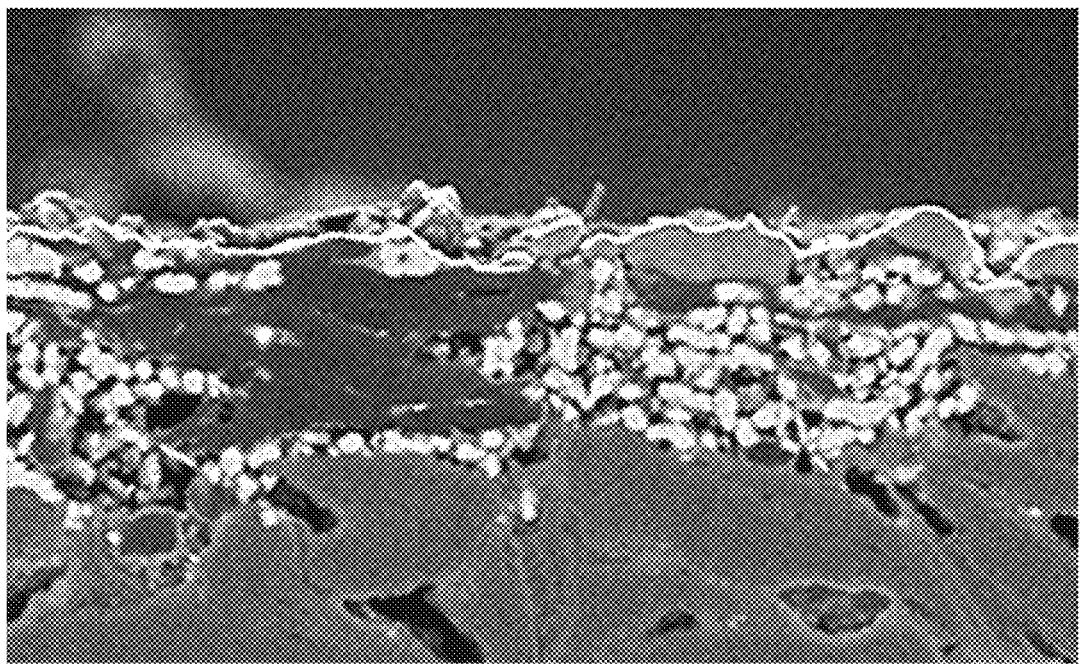
FIG. 29 is a SEM image showing a cross section of a surface of a negative electrode when a lithium secondary battery not including a positive electrode according to Example is shut down.
Figure 30:
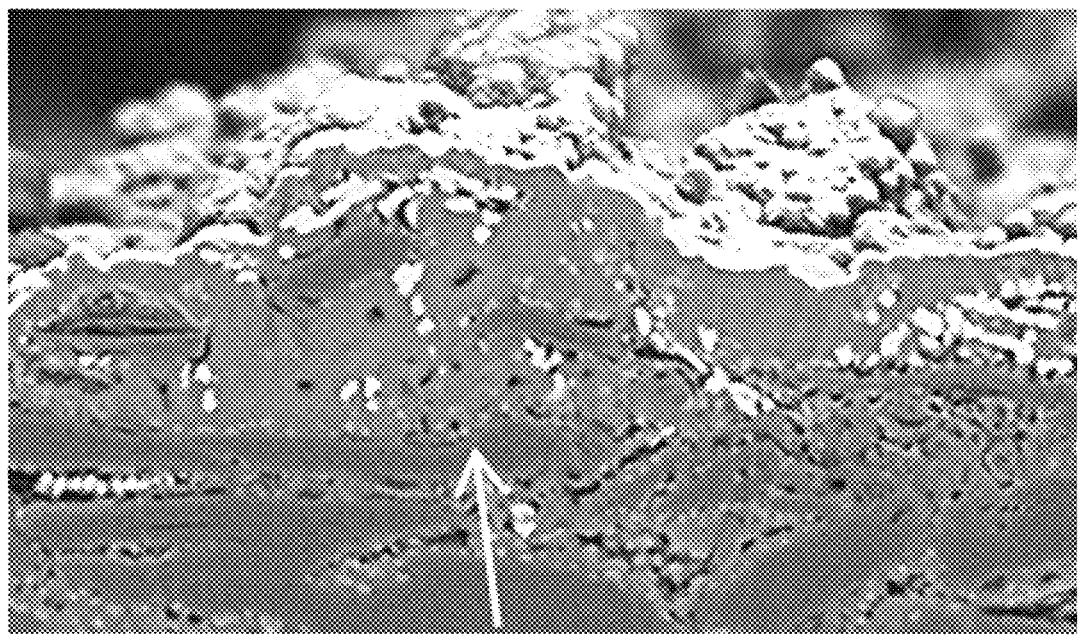
FIG. 30 is a SEM image showing a surface of a negative electrode cross section when a lithium secondary battery including both of a negative electrode with a negative electrode function layer and a positive electrode is shut down.

The lithium secondary battery according to an embodiment of the present disclosure may include both of the negative electrode function layer positioned on the negative electrode and the positive electrode active material layer including the first positive electrode active material and the second positive electrode active material, thereby reducing thermal runaway due to thermal/physical impacts and assisting the flake-shaped polyethylene particles in being melted to shut down (or perfectly shut down) ion passages. In a secondary battery not including the positive electrode according to an embodiment of the present disclosure, the ion passages may not be perfectly shut down during thermal runaway due to thermal/physical impacts (see FIG. 29). However, in a secondary battery including both of the negative electrode including the negative electrode function layer and the positive electrode according to an embodiment of the present disclosure, the ion passages can be shut down (or perfectly shut down) during thermal runaway due to thermal/physical impacts, thereby obtaining a safety maximizing or increasing effect (see FIG. 30).

Meanwhile, the positive electrode 125b may include a positive electrode current collector and a positive electrode active material layer positioned on the positive electrode current collector.

The positive electrode active material layer may include the first positive electrode active material including at least one composite oxide of lithium and a metal of cobalt, manganese, nickel, or a combination thereof, and the second positive electrode active material including a compound represented by the Chemical Formula (1).

$$\text{LiaFe}_{1-x}\text{M}_x\text{PO}_4 \tag{1}$$

wherein $0.90 \leq a \leq 1.8$, $0 \leq x \leq 0.7$, and M is Mg, Co, Ni or combinations thereof.

In addition, the positive electrode active material layer may further include a positive electrode function layer positioned on the positive electrode active material layer.

The first positive electrode active material may be at least one composite oxide of lithium and a metal of cobalt, manganese, nickel, or a combination thereof. Examples of the first positive electrode active material may include a compound represented by one of the following Chemical Formulas:

$\text{Li}_a\text{A}_{1-b}\text{X}_b\text{D}_2$ ($0.90 \leq a \leq 1.8$, $0 \leq b \leq 0.5$); $\text{Li}_a\text{A}_{1-b}\text{X}_b\text{O}_{2-c}\text{D}_c$ ($0.90 \leq a \leq 1.8$, $0 \leq b \leq 0.5$, $0 \leq c \leq 0.05$); $\text{Li}_a\text{E}_{1-b}\text{X}_b\text{O}_{2-c}\text{D}_c$ ($0 \leq b \leq 0.5$, $0 \leq c \leq 0.05$); $\text{Li}_a\text{E}_{2-b}\text{X}_b\text{O}_{4-c}\text{D}_c$ ($0 \leq b \leq 0.5$, $0 \leq c \leq 0.05$); $\text{Li}_a\text{Ni}_{1-b-c}\text{Co}_b\text{X}_c\text{D}_\alpha$ ($0.90 \leq a \leq 1.8$, $0 \leq b \leq 0.5$, $0 \leq c \leq 0.5$, $0 < \alpha \leq 2$); $\text{Li}_a\text{Ni}_{1-b-c}\text{Co}_b\text{X}_c\text{O}_{2-\alpha}\text{T}_\alpha$ ($0.90 \leq a \leq 1.8$, $0 \leq b \leq 0.5$, $0 \leq c \leq 0.05$, $0 < \alpha \leq 2$); $\text{Li}_a\text{Ni}_{1-b-c}\text{Co}_b\text{X}_c\text{O}_{2-\alpha}\text{T}_2$ ($0.90 \leq a \leq 1.8$, $0 \leq b \leq 0.50$, $0 \leq c \leq 0.05$, $0 < \alpha \leq 2$); $\text{Li}_a\text{Ni}_{1-b-c}\text{Mn}_b\text{X}_c\text{D}_\alpha$ ($0.90 \leq a \leq 1.8$, $0 \leq b \leq 0.5$, $0 \leq c \leq 0.05$, $0 < \alpha \leq 2$); $\text{Li}_a\text{Ni}_{1-b-c}\text{Mn}_b\text{X}_c\text{O}_{2-\alpha}\text{T}_\alpha$ ($0.90 \leq a \leq 1.8$, $0 \leq b \leq 0.5$, $0 \leq c \leq 0.05$, $0 < \alpha < 2$); $\text{Li}_a\text{Ni}_{1-b-c}\text{Mn}_b\text{X}_c\text{O}_{2-\alpha}\text{T}_2$ ($0.90 \leq a \leq 1.8$, $0 \leq b \leq 0.5$, $0 \leq c \leq 0.05$, $0 < \alpha < 2$); $\text{Li}_a\text{Ni}_b\text{E}_c\text{G}_d\text{O}_2$ ($0.90 \leq a \leq 1.8$, $0 \leq b \leq 0.9$, $0 \leq c \leq 0.5$, $0.001 \leq d \leq 0.1$); $\text{Li}_a\text{Ni}_b\text{Co}_c\text{Mn}_d\text{G}_e\text{O}_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $\text{Li}_a\text{NiG}_b\text{O}_2$ ($0.90 \leq a \leq 1.8$, $0.001 \leq b \leq 0.1$); $\text{Li}_a\text{CoG}_b\text{O}_2$ ($0.90 \leq a \leq 1.8$, $0.001 \leq b \leq 0.1$); $\text{Li}_a\text{Mn}_{1-b}\text{GbO}_2$ ($0.90 \leq a \leq 1.8$, $0.001 \leq b \leq 0.1$); $\text{Li}_a\text{Mn}_2\text{G}_b\text{O}_4$ ($0.90 \leq a \leq 1.8$, $0.001 \leq b \leq 0.1$); $\text{Li}_a\text{Mn}_{1-g}\text{G}_g\text{PO}_4$ ($0.90 \leq a \leq 1.8$, $0 \leq g \leq 0.5$); $\text{QO}_2$; $\text{QS}_2$; $\text{LiQS}_2$; $\text{V}_2\text{O}_5$; $\text{LiV}_2\text{O}_5$; $\text{LiZO}_2$; $\text{LiNiVO}_4$; $\text{Li}_{(3-f)}\text{J}_2(\text{PO}_4)_3$ ($0 \leq f \leq 2$); $\text{Li}_{(3-f)}\text{Fe}_2(\text{PO}_4)_3$ ($0 \leq f \leq 2$); and $\text{Li}_a\text{FePO}_4$ ($0.90 \leq a \leq 1.8$).

In the above chemical formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Here, the compounds may have a coating layer on the surface, or may be mixed with another compound having a coating layer. The coating layer may include at least one coating element compound selected from the group of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable coating method (for example, spray coating or dipping) that demonstrates no adverse influence (or substantially no adverse influence) on properties of the positive electrode active material by using these elements in the compound, which will be well understood by one skilled in the art and further description thereof is not necessary here.

In an embodiment, the first positive electrode active material and the second positive electrode active material may be included in a weight ratio in a range from 97:3 to 80:20, for example, 95:5 to 85:15.

The first positive electrode active material may be included in an amount in a range from 70 wt % to 99 wt % based on the total weight of the positive electrode active material layer, for example, 85 wt % to 99 wt %, 87 wt % to 95 wt %, or 90 wt % to 98 wt %. When the amount of the first positive electrode active material satisfies the range, the safety can be improved without a reduction in the capacity.

The second positive electrode active material may include, for example, $\text{LiFePO}_4$.

The second positive electrode active material may be included in an amount in a range from 1 wt % to 15 wt % based on the total weight of the positive electrode active material layer, for example, 2 wt % to 15 wt %, 2 wt % to 12 wt %, or 2 wt % to 10 wt %. When the amount of the second positive electrode active material satisfies the range, the safety can be improved without a reduction in the capacity.

Usable examples of the positive electrode current collector may include, but not limited to, aluminum and nickel.

Optionally, the positive electrode active material layer may further include a positive electrode conductive material and a positive electrode binder.

Each of the positive electrode conductive material and the positive electrode binder may be included in an amount in a range from 1 wt % to 5 wt % based on the total weight of the positive electrode active material layer.

The positive electrode conductive material may be used to provide the positive electrode with conductivity (e.g., electrical conductivity), and kinds of the positive electrode conductive material are the same as those of the negative electrode conductive material.

The positive electrode binder may serve to improve binding properties of the positive active material particles with one another and with a current collector, and examples of the positive electrode binder may include, but not limited to, polyvinyl alcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The electrolyte includes a non-aqueous organic solvent and a lithium salt.

The non-aqueous organic solvent serves as a medium for transmitting ions taking part in the electrochemical reaction of a battery. Examples of the non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, methylpropionate, ethylpropionate, γ-butyrolactone, decanolide, valerolactone, mevalonolactone, caprolactone and the like. Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone, and the like. In addition, examples of the alcohol-based solvent may include ethyl alcohol, isopropyl alcohol, and the like, and examples of the aprotic solvent may include nitriles, such as R—CN (wherein R is a C2 to C20 linear, branched, or cyclic hydrocarbon group, or includes a double bond, an aromatic ring, or an ether bond), amides, such as dimethylformamide, dioxolanes, such as 1,3-dioxolane, or sulfolanes.

The non-aqueous organic solvent may be used alone or in a mixture of more than one material. When the non-aqueous organic solvent is used in a mixture, the mixture ratio can be controlled in accordance with desirable battery performance and can be any suitable mixture ratio generally used in the art.

In addition, the carbonate-based solvent may be used by mixing a cyclic carbonate and a chain-type carbonate. In this case, when the cyclic carbonate and the chain-type carbonate are mixed together to a volume ratio in a range from 1:1 to 1:9, excellent performance of the electrolyte may be demonstrated.

The aromatic hydrocarbon-based organic solvent may be an aromatic hydrocarbon-based compound represented by the following Chemical Formula (2):

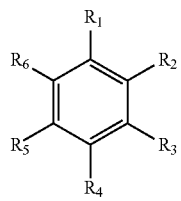

(2)

wherein R1 to R6 are the same or different and are selected from the group consisting of a hydrogen, a halogen, a C1 to C10 alkyl group, a C1 to C10 haloalkyl group, and a combination thereof.

Examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In order to improve the cycle life of a battery, the non-aqueous electrolyte may further include vinylene carbonate or an ethylene carbonate-based compound represented by the following Chemical Formula (3):

(3)

wherein R7 and R8 R6 are the same or different and are selected from the group consisting of a hydrogen, a halogen group, a cyano group (CN), a nitro group (NO2) and a fluorinated C1 to C5 alkyl group, wherein at least one of the $R_7$ and $R_8$ is a halogen group, a cyano group (CN), a nitro group ($NO_2$), or a fluorinated C1 to C5 alkyl group, but both of R7 and R8 are not necessarily hydrogens.

Representative examples of the ethylene carbonate-based compound may include difluoro ethylene carbonate, chloroethylene carbonate, dichloroethylene carbonate, bromoethylenecarbonate, dibromoethylene carbonate, nitroethylene carbonate, cyanoethylenecarbonate, fluoroethylene carbonate, and the like. When an additive for improving the cycle life is additionally used, the amount of the additive may be suitably or appropriately controlled.

The lithium salt dissolved in the organic solvent functions as a supply source of lithium ions in the battery to enable a basic operation of a rechargeable lithium battery and promotes movement of lithium ions between positive and negative electrodes. Examples of the lithium salt may include as a supporting salt one or more selected from $LiPF_6$, $LiBF_4$, $LiSbF_6$, $LiAsF_6$, $LiN(S_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI and $LiB(C_2O_4)_2$, and lithium bis(oxalato) borate (LiBOB). The lithium salt may be used at a concentration in a range from 0.1 M to 2.0 M, and in one embodiment, at a concentration in a range from 0.5 to 2.0 M. When the lithium salt is included at the above concentration range, the electrolyte may demonstrate suitable or appropriate conductivity and viscosity, thereby enhancing lithium ion mobility.

As described above, the separator 125c may be positioned between the positive electrode 125b and the negative electrode 125a. The separator 125c may be made of, for example, one selected from a glass fiber, polyester, polyethylene, polypropylene, polytetrafluoroethylene and a combination thereof, and may be a non-woven or woven material.

The separator made of, for example, a polyolefin-based polymer, such as polyethylene or polypropylene, may be mainly used for a lithium secondary battery. In order to obtain heat resistance or mechanical strength, a separator coated with a composition including a ceramic component or a polymeric material, may be used and, optionally, may have a single-layered structure or a multi-layered structure.

The following examples illustrate aspects of the present disclosure in more detail. These examples, however, are provided only for illustrative purposes but are not intended to limit the scope of the present disclosure.

Fabrication of Lithium Secondary Battery

Example 1: Battery Including 2 μm Flake-Shaped PE Particles

A positive electrode active material slurry was prepared by mixing 95 wt % of a positive electrode active material having $LiCoO_2/LiFePO_4$ (LCO/LFP) mixed to a weight ratio of 9:1, 3 wt % of polyvinylidenfluoride as a binder, and 2 wt % ketjen black as a conductive material in N-methylpyrrolidone as a solvent. The positive electrode active material slurry was coated on both surfaces of an Al current collector, dried and pressed to provide a positive electrode (cathode) including a positive electrode active material layer.

A negative electrode active material slurry was prepared by mixing 98 wt % of graphite, 0.8 wt % of carboxymethyl cellulose and 1.2 wt % of styrene-butadiene rubber in pure water. The negative electrode active material slurry was coated on both surfaces of a Cu current collector, dried and pressed to provide a negative electrode (anode) including a negative electrode active material layer.

48 wt % of flake-shaped PE particles having an average particle size of 2 μm (Major axis length/Minor axis length=about 2, thickness=about 0.6 μm), 47 wt % of alumina (Average particle diameter (D50)=0.7 μm) and 5 wt % of acrylated styrene-based rubber as a binder were mixed in an alcohol-based solvent to prepare a PE/alumina slurry.

The PE/alumina slurry was coated on the surface of the negative electrode, dried and pressed to provide a coated negative electrode including a coating layer including flake-shaped PE particles.

The positive electrode, the separator including a PE/PP multi-layered substrate, and the negative electrode including the coating layer including the flake-shaped PE particles were sequentially stacked to fabricate an electrode assembly shown in FIGS. 21A and 21B, followed by injecting an electrolyte, thereby fabricating a secondary battery.

Example 2: Battery Including 4 μm Flake-Shaped PE Particles

A secondary battery was fabricated in substantially the same manner as in Example 1, except that a negative electrode was provided using flake-shaped PE particles having an average particle size of 4 μm (Major axis length/Minor axis length=about 2.4, thickness=about 0.6 μm).

Example 3: Battery Including 6 μm Flake-Shaped PE Particles

A secondary battery was fabricated in substantially the same manner as in Example 1, except that a negative electrode was provided using flake-shaped PE particles having an average particle size of 6 μm (Major axis length/Minor axis length=about 2.4, thickness=about 0.6 μm).

Comparative Example: Battery Including Spherical PE Particles

A secondary battery was fabricated in substantially the same manner as in Example 1, except that a negative electrode was provided using a dispersion liquid prepared by dispersing spherical PE particles having an average particle size of 4 μm, instead of 2 μm flake-shaped PE particles, in an alcohol-based solvent.

Evaluation Example

1. Evaluation of Electrode Plate Resistance Increase Rates

Figure 28:
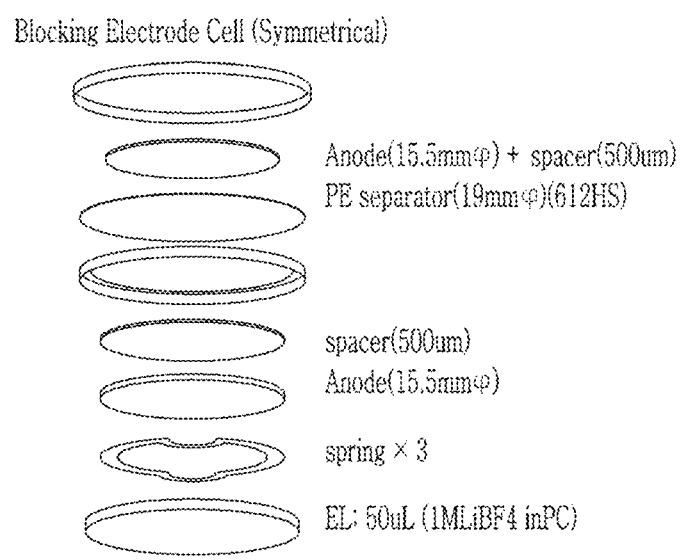
FIG. 28 is a diagram showing a symmetrical coin-type cell fabricated for evaluating resistance increase rates of an electrode plate.

A negative electrode (anode) including a coating layer including the flake-shaped PE particles according to Example 1, a separator including a PE/PP multi-layered substrate, and a negative electrode including a coating layer including the flake-shaped PE particles according to Example 1, were sequentially stacked in that order, followed by injecting an electrolyte prepared by dissolving 1M LiBF4 in propylene carbonate (PC), thereby fabricating a symmetrical coin-type battery shown in FIG. 28.

FIG. 28 is a diagram showing symmetrical coin-type batteries fabricated for evaluating resistance increase rates of electrode plates.

A temperature sensor and a resistance meter were installed on the fabricated symmetrical coin-type battery, and the battery was inserted into a temperature-varying chamber for evaluation. Changes in temperatures and resistances of the symmetrical coin-type battery were evaluated while increasing the temperature at a rate of 10° C./min, and increase rate evaluation results of AC resistance (ACR) (ohm) of electrode plates depending on the temperature is shown in FIG. 26.

Figure 26:
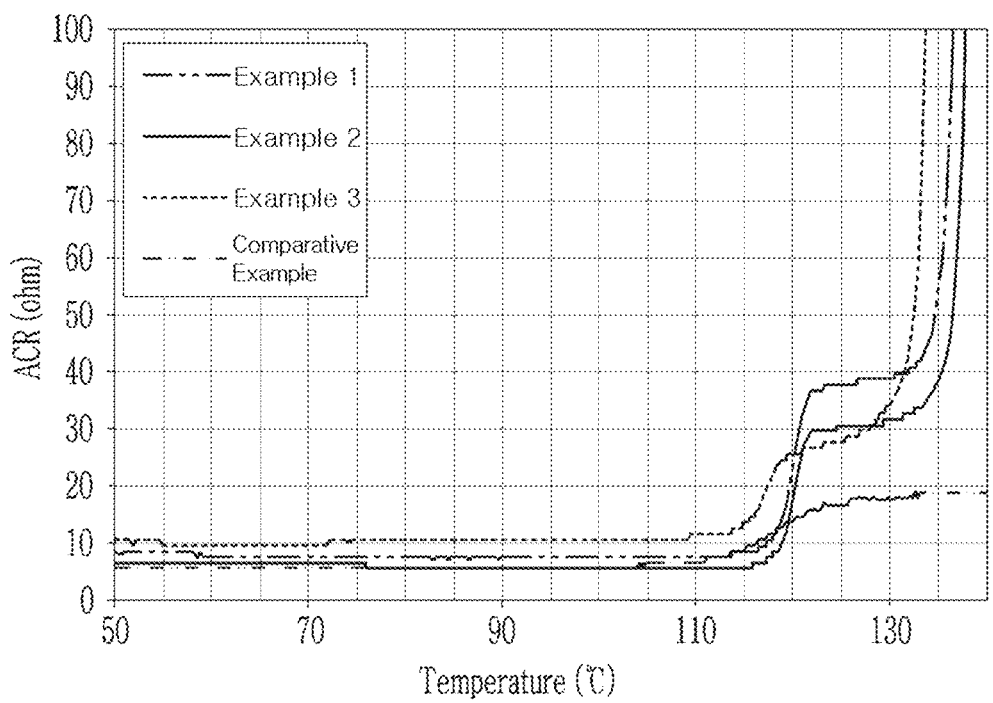
FIG. 26 is a graph showing ACR increase rate evaluation results of electrode plates depending on temperatures.

FIG. 26 is a graph showing FIG. 26 is a graph showing ACR increase rate evaluation results of electrode plates depending on temperatures.

As confirmed from FIG. 26, AC resistance (ACR) increase rates of electrode plates in Examples 1 to 3 were remarkably increased at a high temperature of 120° C. or higher, compared to the ACR increase rate of an electrode plate in Comparative Example.

From the evaluation results, in the battery cell including the electrode composition according to an embodiment, ion passages can be effectively shut down during thermal runaway due to thermal/physical impacts. Therefore, it can be expected for a shut-down function to be manifested quickly.

2. Evaluation of Cycle-Life Characteristics

Figure 27:
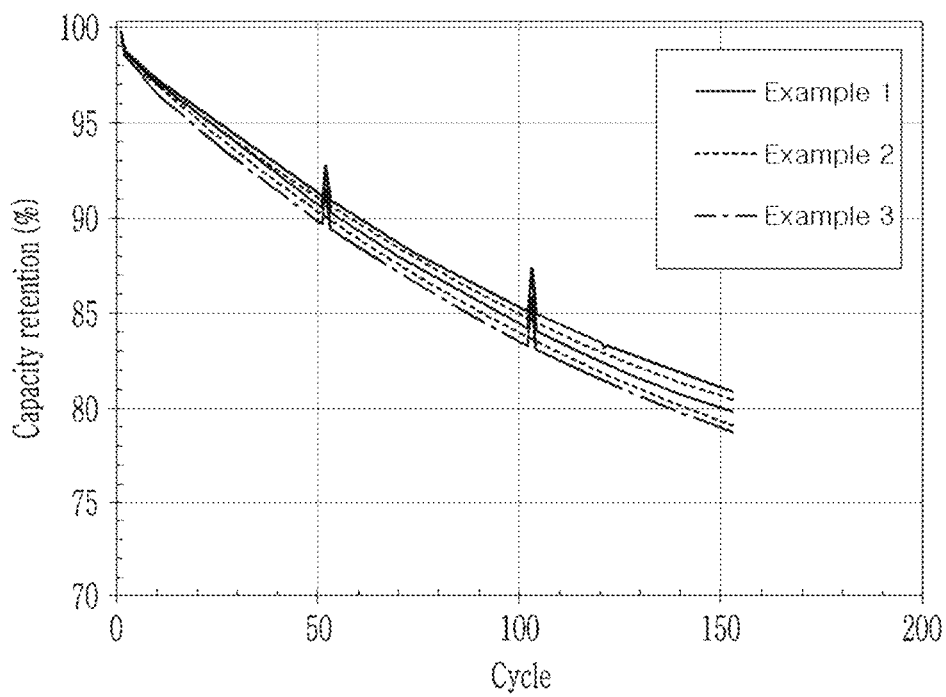
FIG. 27 is a graph showing capacity retention evaluation results of lithium secondary batteries according to Examples for 150 cycles.

Lithium secondary batteries fabricated in Examples 1 to 3 were charged at a charge potential of 4.4 V at 0.5C/0.5C rates and then discharged to reach 3.0 V. After 150 cycles, cell capacity decrease rates were measured, and the results are shown in FIG. 27. At the 51st and 101st cycles, the battery cells were charged at a charge potential of 4.4 V at 0.5C/0.5C and then discharged to reach 3.0 V. Then, capacity retentions were measured to evaluate capacity recovery.

FIG. 27 is a graph showing capacity retention evaluation results of lithium secondary batteries according to Examples 1 to 3 for 150 cycles.

Referring to FIG. 27, even after 150 cycles, it was confirmed that excellent capacity retention ratios (%) were demonstrated.

As a result, the lithium secondary battery according to an embodiment of the present disclosure can effectively demonstrate a shut-down function while maintaining excellent battery characteristics.

While the subject matter of the present disclosure has been particularly shown and described with reference to exemplary embodiments thereof, it will be understood by those of ordinary skill in the art that various changes in form and details may be made therein without departing from the spirit and scope of the present disclosure as defined by the following claims and their equivalents.

What is claimed is:

1. An energy storage module comprising:
a plurality of battery cells arranged in a first direction such that long side surfaces of adjacent ones of the battery cells face one another, each of the battery cells comprising a vent;
a plurality of insulation spacers, each adjacent pair of the battery cells having at least one of the insulation spaces between the long side surfaces of the battery cells, each of the insulation spacers comprising a heat-insulating first sheet and a plurality of flame-retardant second sheets respectively adhered to opposite surfaces of the first sheet by an adhesion member;
a cover member comprising an internal receiving space configured to accommodate the battery cells and the insulation spacers;
a top plate coupled to a top of the cover member, the top plate comprising ducts respectively corresponding to the vents of the battery cells and fluid guide protrusions around fire extinguishing agent openings respectively corresponding to the insulation spacers, the fluid guide protrusions extending above the respectively corresponding insulation spacers;
a top cover coupled to a top of the top plate and having discharge openings respectively corresponding to the ducts; and
an extinguisher sheet between the top cover and the top plate, the extinguisher sheet being configured to emit a fire extinguishing agent at a temperature exceeding a reference temperature,
wherein the long side surfaces of adjacent battery cells are spaced apart from each other by a first distance,
wherein a thickness of each of the insulation spacers is less than 50% of the first distance, and
wherein edges of the fire extinguishing agent openings are spaced apart from the corresponding insulation spacer such that, when the fire extinguishing agent is emitted from the extinguisher sheet, the fire extinguishing agent fills spaces between the insulation spacers and the battery cells through the fire extinguishing agent openings.

2. The energy storage module of claim 1, wherein the first sheet comprises ceramic paper, and the second sheets comprise MICA paper.

3. The energy storage module of claim 2, wherein the first sheet comprises a ceramic fiber comprising an alkaline earth metal.

4. The energy storage module of claim 1, wherein each of the insulation spacers has a width-direction size less than twice a height-direction size thereof, and
wherein the first sheet is adhered to the second sheets at opposite ends thereof by the adhesion member.

5. The energy storage module of claim 4, wherein the insulation spacers further comprise an edge part comprising a plastic material, and
wherein the edge part is formed at peripheral edges of the first and second sheets by insert molding.

6. The energy storage module of claim 5, wherein the edge part has a width in a range from 3 mm to 6 mm.

7. The energy storage module of claim 4, wherein one surface of each of the insulation spacers faces the long side surface of one of the battery cells, and the other surface of each of the insulation spacers faces the long side surface of another one of the battery cells.

8. The energy storage module of claim 4, wherein the first sheet and the second sheets are spaced apart from each other at central portions thereof to form air passages.

9. The energy storage module of claim 8, wherein the first sheet is spaced apart from each of the second sheets by the adhesion member.

10. The energy storage module of claim 1, wherein a width-direction size of the insulation spacers is greater than twice a height-direction size thereof, and
wherein the first sheet and the second sheets are adhered to each other by the adhesion member applied to a region adjacent top and bottom ends of each of the first sheet and the second sheets.

11. The energy storage module of claim 10, wherein one surface of each of the insulation spacers faces the long side surfaces of two of the battery cells, and the other surface of each of the insulation spacers faces the long side surfaces of another two of the battery cells.

12. The energy storage module of claim 1, wherein each of the battery cells comprises:
a negative electrode comprising a negative electrode current collector, a negative electrode active material layer on the negative electrode current collector, and a negative electrode function layer on the negative electrode active material layer; and
a positive electrode comprising a positive electrode current collector and a positive electrode active material layer on the positive electrode current collector,
wherein the negative electrode function layer comprises flake-shaped polyethylene particles, and the positive electrode active material layer comprises a first positive electrode active material comprising at least one composite oxide of lithium and a metal selected from the group consisting of cobalt (Co), manganese (Mn), nickel (Ni) and a combination of these metals, and a second positive electrode active material comprising a compound represented by the Chemical Formula (1):

$$Li_aFe_{1-x}M_xPO_4 \qquad (1)$$

wherein $0.90 \leq a \leq 1.8$, $0 \leq x \leq 0.7$, and M is Mg, Co, Ni or combinations thereof.

13. The energy storage module of claim 12, wherein the flake-shaped polyethylene particles have an average particle diameter (D50) in a range from 1 μm to 8 μm.

14. The energy storage module of claim 12, wherein the flake-shaped polyethylene particles have an average particle diameter (D50) in a range from 2 μm to 6 μm.

15. The energy storage module of claim 12, wherein the flake-shaped polyethylene particles have a thickness in a range from 0.2 μm to 4 μm.

16. The energy storage module of claim 12, wherein the first positive electrode active material and the second positive electrode active material are contained in a weight ratio in a range from 97:3 to 80:20.

17. The energy storage module of claim 1, wherein the insulation spacer is not between the corresponding fluid guide protrusions in the first direction.

* * * * *

UNITED STATES PATENT AND TRADEMARK OFFICE
CERTIFICATE OF CORRECTION

| | | |
|---|---|---|
| PATENT NO. | : 11,848,461 B2 | Page 1 of 1 |
| APPLICATION NO. | : 16/901527 | |
| DATED | : December 19, 2023 | |
| INVENTOR(S) | : Jin Taek Kim et al. | |

It is certified that error appears in the above-identified patent and that said Letters Patent is hereby corrected as shown below:

In the Claims

In Column 28, Line 41, in Claim 12, delete "LiaFe1–xMxPO4" and insert -- $Li_aFe_{1-x}M_xPO_4$ --.

Signed and Sealed this
Thirtieth Day of April, 2024

Katherine Kelly Vidal
*Director of the United States Patent and Trademark Office*